US008483428B1

(12) United States Patent
    Anderson

(10) Patent No.: US 8,483,428 B1
(45) Date of Patent: Jul. 9, 2013

(54) APPARATUS FOR PROCESSING A DIGITAL IMAGE

(76) Inventors: Brian J. Anderson, San Jose, CA (US); Kimberly Lynn Anderson, legal representative, San Jose, CA (US)

( * ) Notice: Subject to any disclaimer, the term of this patent is extended or adjusted under 35 U.S.C. 154(b) by 250 days.

(21) Appl. No.: 12/927,525

(22) Filed: Nov. 15, 2010

Related U.S. Application Data

(63) Continuation-in-part of application No. 12/655,769, filed on Jan. 6, 2010, and a continuation-in-part of application No. 12/800,266, filed on May 12, 2010.

(51) Int. Cl.
    *G06K 9/00* (2006.01)
(52) U.S. Cl.
    USPC .......................................... 382/100; 382/266
(58) Field of Classification Search
    None
    See application file for complete search history.

(56) References Cited

U.S. PATENT DOCUMENTS

| 5,696,888 | A  | * | 12/1997 | Ikeda ............................. 358/1.2 |
| 8,125,571 | B2 | * | 2/2012 | Guermoud et al. ........... 348/719 |
| 2002/0141499 | A1 | * | 10/2002 | Goertzen ................. 375/240.12 |
| 2009/0262190 | A1 | * | 10/2009 | Dotchevski et al. .......... 348/143 |

* cited by examiner

*Primary Examiner* — Shefali Goradia

(57) ABSTRACT

A high-resolution digital image is to be split into multiple regions. Each region is to be processed independently, in the vertical or horizontal direction, from its original resolution to a target resolution. Each of the processed regions is to be displayed in the same order as originally defined in the high-resolution digital image, such that the display of all the processed regions would seems as if high-resolution digital image is processed from its original resolution to the target resolution as one region in a contiguous manner. The ratio of the target resolution over the original resolution can be either an integer or a fraction.

31 Claims, 9 Drawing Sheets

Fig. 2.H

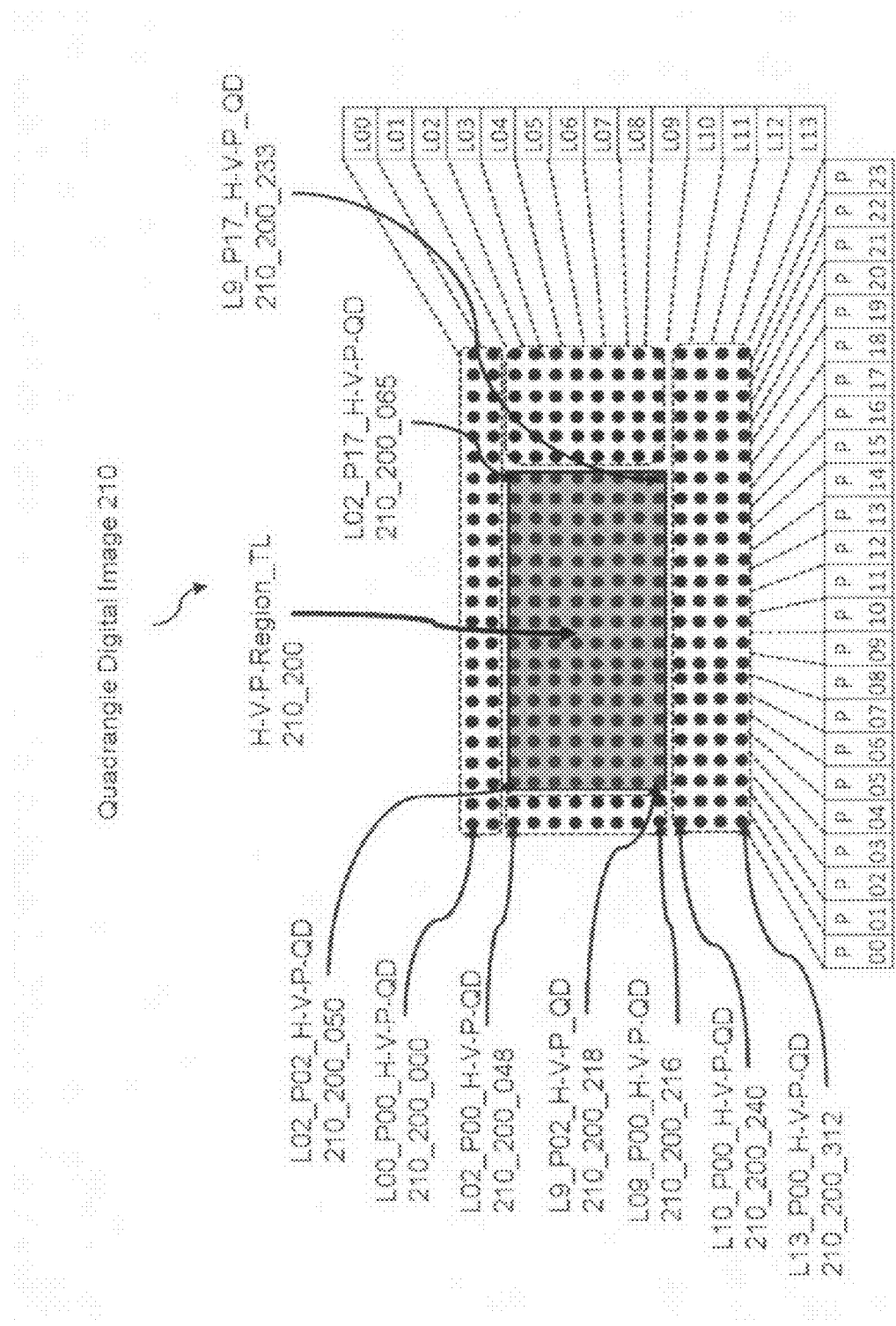

APPARATUS FOR PROCESSING A DIGITAL IMAGE

CROSS REFERENCE TO RELATED APPLICATION

This application is a continuation-in-part of U.S. patent application Ser. No. 12/800,266 filed May 12, 2010, entitled "Apparatus For Partitioning And Processing A Digital Image Using Two Or More Defined Regions", and a continuation-in-part of U.S. patent application Ser. No. 12/655,769, filed Jan. 6, 2010, entitled "Method For Partitioning A Digital Image Using Two Or More Defined Regions", both applications are individually incorporated herein by reference in their entirety.

TECHNICAL FIELD

The subject of this application generally relates to the field of digital image processing and more particularly to the processing of regions or portions of a digital image.

BACKGROUND

Digital cameras use electronic devices such as Charge Coupled Devices (CCD) to capture light, of an original image, and produce a digital representation of an image. The digital representation can be further manipulated using different compression or transmission techniques or standards such as Moving Picture Experts Group (MPEG). Furthermore, the digital representation of the image can be stored in various digital formats in accordance with the intended memory storage mediums e.g. Hard disk, DVD, CD-Rom, etc. . . . such that the reproduction of the original image may be achieved using a variety of means or mediums using the stored digital representation of the original image. For examples, electronic display panel devices that can display the image on their screen.

The digital representation of the image can greatly vary in quality depending on the sampling of the original image. Each sample of the original image represents a small portion of the overall image. Therefore, more samples are required in order to have a better or more accurate representation of the original image. A pixel represents one sample of the original image. Normally, an image is sampled using a two-dimensional grid having a width, X, and a height, Y, that are specified in unit of pixel, where the digital image resolution corresponds to X times Y, and each pixel corresponds to the smallest single component of the original image. For example, a first camera with a resolution of 640×480 would have 640 pixels in the horizontal direction and 480 pixels in the vertical direction. The digital image resolution, total number of pixels, is 307,200 pixels. Higher resolution requires more pixels to be generated when capturing an image, and thus the closer the digital image produced is to the original image. Hence, a second digital camera with a resolution of 1280×960 would have a total number of pixels of 1,228,800 pixels or four times the resolution of the first camera.

Each pixel of a digital image corresponds to video data information that can be expressed in a digital format using a number of bits. The accuracy of the digital representation used to describe the content of each pixel of the video data information of the original image may be expressed as number of bits per pixel (bpp). A broader range of distinct colors can be represented with a higher number of bits per pixel. Currently, there are many different formats that are in use to capture and/or display color information, e.g. RGB where a portion of an original image is sampled using Red, Green, and Blue color data information. For example, a 24-bit RGB color model uses 8 bits to represent Red, 8 bits to represent Green and 8 bits to represent Blue. Under this model, the accuracy of digital representation or resolution of each of these three colors possesses a $2^8$ or two hundred fifty six (256) levels. Therefore, the combination of these three colors, each having 256 levels, is equivalent to (256×256×256) or 16,777,216 possible colors.

A video camera captures a scene for a specific duration of time, and produces many sequential digital images. Normally, each digital image is referred to as a frame, having a frame size defined as number of horizontal pixels×number of vertical pixels. A frame rate is specified that represents the number of frames being captured per second. In addition, a scanning system is identified as progressive or interlaced to indicate how the video frames are generated and thus how they should be processed and displayed so that the original scene is faithfully reproduced when these digital images are played back in sequence using an electronic display panel, e.g. a digital television set.

In order to reproduce the original scene timing, each digital image, or frame within the scene, must be reproduced and displayed in a given amount of time. Hence, the allotted time required to process and display one pixel is limited and finite. Electronic display devices resolution is specified, in a similar way as explained above for a digital camera, and usually matches the resolution of the video data information being displayed. Again, the higher the resolution of the electronic display device is, the better the image that is being reproduced. As the electronic display panel technology advances and is capable of displaying an ever-higher resolution, the performance of the device electronics and circuitry must be able to process the video data information for each pixel within an ever-smaller allotted amount of time.

The processing demands on electronic circuits for High-Definition television (HD TV), e.g. 1,920 pixels wide and 1,080 pixels high, is much greater than a Standard-Definition television (SD TV), e.g. 720 pixels wide and 480 pixels high. The next generation of digital TVs and projectors, recently developed, will be able to display four times the high definition resolution of current HD TV sets. This Quad-HD set is capable of displaying 3,840 pixels wide and 2,160 pixels high. This presents a big challenge to the processing circuitry, where each pixel must be processed and faithfully reproduced or displayed regardless of the resolution of the input image. Various types of standardized digital interfaces such as HDMI 1.4 or DisplayPort 1.2a may be used for Quad-HD (3840×2160), HD (1,920×1,080), or other lower resolution such as SDTV (720×480).

The need arises to provide an electronic system capable of faithfully processing digital images with various resolutions and be able to display them using a Quad-HD resolution display or higher resolution type of electronic display panels. Marseille Networks' 4×HD™ video technology delivers the ability to process digital images to be displayed in 3840×2160 resolution, while selectively removing artifacts and preserving stunning image details. Furthermore, Marseille Networks is the first to introduce Quad-HD solution to home theater systems. Marseille Networks' 4×HD™ video technology provides a digital image processing system with ample flexibility and processing power for blending and or scaling various types of video data information streams, including Quad-HD, or HD streams, to be displayed over Quad-HD display panel. The need arises for a flexible yet powerful digital image processing system that incorporates independent vertical or horizontal scaling, filtering, and/or processing to drive such high resolution electronic display panels. Exemplary output display module is disclosed and described herein. Multiple output display modules may be used within a Digital Image Processing System such as previously disclosed.

BRIEF DESCRIPTION OF THE DRAWINGS

FIG. 2G shows an exemplary model representing digital image processing in the horizontal direction for the quadrilateral digital image of FIG. 2F in accordance with one embodiment.

FIG. 2H shows another exemplary model representing digital image processing in the horizontal direction for the quadrilateral digital image of FIG. 2F in accordance with one embodiment.

FIG. 2I shows another exemplary model representing digital image processing in the horizontal direction for the quadrilateral digital image of FIG. 2F in accordance with one embodiment.

DETAILED DESCRIPTION

Figure 1:
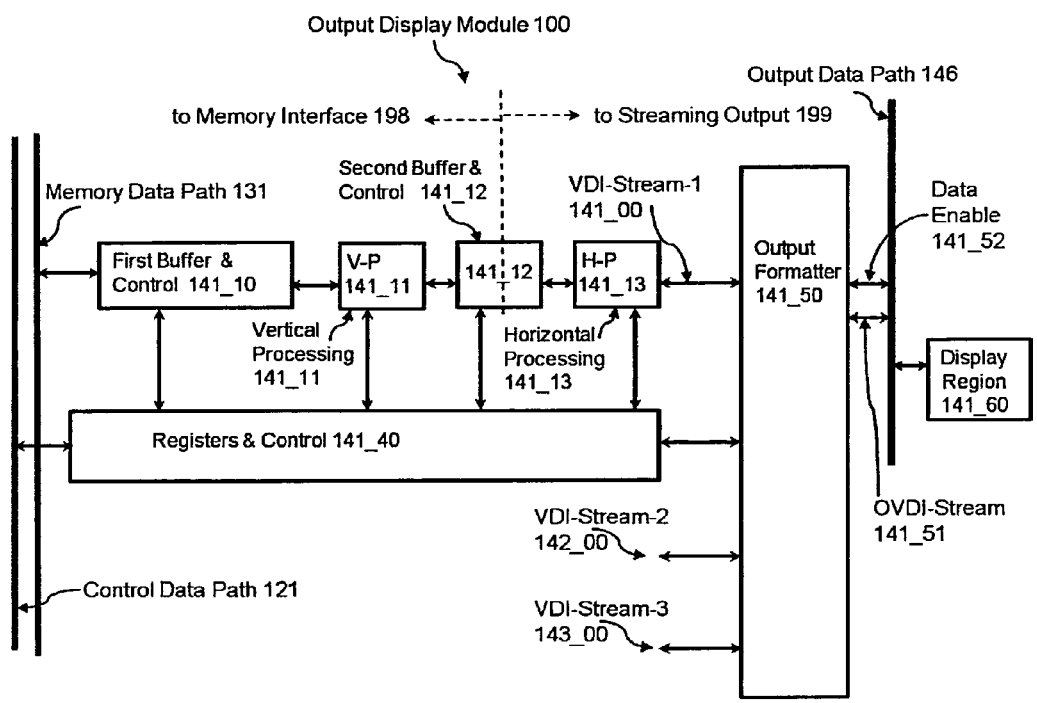
FIG. 1 is a block diagram illustrating an exemplary output display module for processing a digital image in accordance with one embodiment.

The present disclosure presents techniques to process video data information of captured digital images received at a given resolution and output the processed video data information to be displayed using high-resolution electronic display panel that comprises two or more defined display regions. A captured digital image is partitioned into multiple regions and the video data information of each region is independently processed and outputted to be displayed using a correspondent display region. In accordance with one embodiment, a portion of each of the processed video data information is displayed using the corresponding display region. The concatenation of all displayed portions of the processed video data information produces a seemingly one contiguous digital image at a resolution that is equivalent to the electronic display panel's resolution. The human eye can perceive certain artifacts at the boundaries of the display regions of the electronic display panel that are due to the independent processing of each region. The reduction or elimination of such artifacts is a major challenge. This challenge continues to increase with an ever-increasing size and resolution capabilities of the electronic display panels. In addition, this disclosure describes an output display module that is a part of a digital image processing system that is used to display very high-resolution images by concatenating the processed video data information of multiple low-resolution images, with minimum, or virtually eliminated, artifacts at the boundaries of the defined display regions. Furthermore, the output display module provides a flexible yet powerful digital image processing that incorporates independent vertical and horizontal scaling (or upsampling), filtering and processing of video data information to drive a display region.

The disclosure and the various features and advantageous details are explained more fully with reference to the nonlimiting embodiments that are illustrated in the accompanying drawings and detailed in the following description. Descriptions of well-known processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concepts will become apparent to those of ordinary skill in the art from this disclosure. Other features and associated advantages will become apparent with reference to the following detailed description of specific embodiments in connection with the accompanying drawings.

The term "coupled" is defined as connected, although not necessarily directly, and not necessarily mechanically. The terms "a" and "an" are defined as one or more unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

In general, various processing techniques can be used to process or scale digital images from one specified resolution to another specified resolution. For example, Quad-HD, or higher resolution electronic display panels, can display images using a resolution of 3840×2160 pixels, or higher. The Quad-HD resolution corresponds to 3840 pixels in width and 2160 pixels in height, for a total of 8,294,400 pixels. A high definition (HD) digital image may be specified using 1920 pixels in width and 1080 pixels in height, or in other words a resolution of 1,920×1,080 for a total of 2,073,600 pixels. Therefore, the Quad-HD display panel is capable of displaying four times the number of pixels of an HD digital image. For example, the Quad-HD display panel is partitioned into four regions, each of which is capable of displaying an HD digital and is independently driven by one output display module capable of processing and outputting video data information for a full HD digital image at 1,920×1,080 pixels. The higher the resolution capability of an electronic display panel is, the higher the processing power requirement is to display a given digital image at the full monitor resolution. In the next paragraph, multiple means of providing video data information inputs to each of the output display modules will briefly discuss.

An exemplary captured digital image to be processed comprises pixels organized in lines and columns. The captured digital image's height and width corresponds to the number of lines and the number of pixels per line respectively. In order for a low resolution captured digital image to be displayed using a Quad-HD display panel, the captured digital image is first scaled to 3840×2160 resolution and then split into four regions, where each is then displayed using a corresponding region of the Quad-HD display panel. The processing power and performance required to scale the captured digital image to Quad-HD may not be easily or cost effectively achieved using current technologies. Therefore, one objective of this disclosure is to be able to partition a captured digital image into two or more regions, each of which is independently processed and outputted to a corresponding display region of a high resolution display panel. In the example using a Quad-HD display panel, the exemplary captured digital image is partitioned into four regions. Each region of the captured image is independently processed, scaled to HD resolution, and outputted to be displayed using a corresponding display region of the Quad-HD display panel. In accordance with one embodiment, a quadrangle digital image is defined to comprise one of the partitioned regions of the captured digital image. In accordance with another embodiment, a quadrangle digital image is defined to comprise a concatenation of one of the partitioned regions of the captured digital image and certain number of its neighboring pixels, to be referred to as wings. All of the wings pixels are defined to be within the captured digital image. The quadrangle digital image's resolution is specified using a height of certain number of lines and a width of certain number of pixels per line.

In accordance with one embodiment, the independent processing in the vertical and horizontal direction of the video data information of the quadrangle digital image is achieved by the introduction of newly generated pixels that form a wrapper around the quadrangle digital image. The newly generated pixels are to be referred to as margin pixels. The top and bottom margin pixels comprise a height of at least one line and a width having same number of pixels as the quadrangle digital image. The left and right margin pixels comprise a width of at least one pixel and a height having same number of lines as the quadrangle digital image. The margin pixels may or may not comprise pixels that are within the captured digital image.

In accordance with one embodiment, as the video data information of the first line of the quadrangle digital image is fetched from memory to be stored into a first buffer, a top margin comprising an exact replica of the first line is generated. The top margin pixels will be used in the vertical processing of at least the first line of the quadrangle digital image. As the video data information of the last line of the quadrangle digital image is fetched from memory to be stored into the first buffer, a bottom margin comprising an exact replica of the last line is generated. The bottom margin pixels will be used in the vertical processing of at least the last line of the quadrangle digital image. In accordance with another embodiment, the top margin comprises two or more lines that are generated using an exact replica of the video data information of the first line of the quadrangle digital image. In addition, the bottom margin comprises two or more lines that are generated using an exact replica of the video data information of the last line of the quadrangle digital image. The height of the top and bottom margins is determined in part by the vertical processing and filtering method. Furthermore, there are many different methods that can be used to generate the top and bottom margin pixels, one of which is to use fixed color video data information. Another method is to modify systematically the video data information of existing pixels of the first or last line of the video data information of the quadrangle digital image.

In accordance with one embodiment, the first buffer can store the video data information for up to thirty-two lines of pixels of the quadrangle digital image at a time. In this embodiment, the depth of the top margin is four lines that are located as the first four lines of the first buffer. The top margin pixels are generated on-the-fly while the first line of the quadrangle digital image is being received and stored in the first buffer. The processing in the vertical direction acts on the video data information of a block of eight vertically aligned pixels at a time, starting at the top-leftmost block of the first buffer that comprises the first pixel of the top eight lines. The vertical processing comprises an upsampling filter with eight coefficients that operates on the video data information of the block of eight pixels and produces a new video data information for the first vertically processed pixel (of the first vertically processed line) that is outputted and stored in a second buffer. The vertical processing now repeats to generate a second vertically processed pixel. In the case of upsampling, the vertical processing continues by rotating or shifting the filter's coefficients and using the video data information of the same block of eight pixels previously used, hence a new vertically processed pixel is generated. In the case where upsampling is not required, the vertical processing continues with a new block of eight pixels that are immediately to the right of the previously processed block. The resultant video data information corresponds to the second vertically processed pixel and is outputted and stored immediately to the right of the first vertically processed pixel. The vertical processing continues until the first vertically processed line is completed and fully stored into the second buffer. In general, the block of pixels to be used by the vertical processing comprises (n) lines in height and one pixel in width, and the number of filter's coefficients used for the vertical processing is (n).

In accordance with one embodiment, the process now repeats by (i) shifting up all pixels in the first buffer and thus the pixels of the first buffer's topmost line are discarded, and (ii) repeating the vertical processing of the video data information of a block of eight pixels at a time starting at the top-leftmost block of the first buffer. Therefore, a second vertically processed line is completed and fully stored into the second buffer. The process of shifting up of the first buffer content and repeating the vertical processing continues to generate new vertically processed lines that are then stored into the second buffer. As this vertical processing continues, the first buffer content will be depleted and the first buffer control circuitry will be responsible to fetch from memory the rest of the video data information of the quadrangle digital image until the last line is fetched from memory and stored into the first buffer. At which time, the bottom margin pixels are generated on-the-fly as described above and the vertical processing continues until the last vertically processed line is generated and stored in the second buffer.

In accordance with another embodiment, the vertical processing now repeats, where the topmost pixel of the block of eight pixels starts at the leftmost pixel of the second line of the first buffer and comprise eight vertically aligned pixels. Hence, the block of eight pixels now comprises the first pixel of the second line through the first pixel of the ninth line. This is the equivalent of shifting the block of eight pixels down by one pixel in the vertical direction. Therefore, the video data information of the first vertically processed pixel of the second vertically processed line is outputted to be stored in the second buffer. The vertical processing continues until the second vertically processed line is completed and is fully stored into the second buffer. The vertical processing continues starting at the first pixel of the third line of the first buffer. The block of eight pixels now comprises the leftmost pixels of the third line through the tenth line of the first buffer. The vertical processing continues until the third vertically processed line is completed and fully stored into the second buffer, and so on. This process continues until the last line is fetched from memory and stored into the first buffer. At which time, the bottom margin pixels are generated on-the-fly, as described above, and the last vertically processed line is generated and stored in the second buffer. The vertical processing continues and may wrap around back to the top of the buffer if desired. One advantage of this embodiment is that the video data information of the previous lines remains stored in the first buffer. Thus, a digital image processing effects such as image freeze or rewind may be accomplished with a large enough first buffer's size for the appropriate desired effect. As this vertical processing continues to slide down the first buffer, the first buffer control circuitry will be responsible to fetch from memory the rest of the video data information of the quadrangle digital image and refresh the first buffer content so that the block of eight pixels is assembled appropriately to produce the next desired vertically processed line.

In accordance with one embodiment, the processing of the video data information of the quadrangle digital image in the horizontal direction is achieved by using the vertically processed lines stored in the second buffer and introducing newly generated pixels that form the left and right margin. These margin pixels comprise at least one pixel in width and same number of lines as the vertically processed quadrangle digital image. As each of the vertically processed lines of the quadrangle digital image are generated and stored into the second buffer, at least one left margin pixel is generated comprising an exact replica of the leftmost pixel of the vertically processed line. Similarly, at least one right margin pixel is generated comprising an exact replica of the rightmost pixel of the vertically processed line. The left margin pixels will be included in the horizontal processing of at least the first pixel of the first vertically processed line of the quadrangle digital image. Similarly, the right margin pixels will be included in the horizontal processing of at least the last pixel of the first vertically processed line of the quadrangle digital image. The number of upsampling filter's coefficients is determined in part by the horizontal processing and filtering requirement, and determines in part the width of the right and left margins, as described above for the vertical upsampling filter.

In accordance with one embodiment, the second buffer can store video data information for sixteen vertically processed lines of the quadrangle digital image and the left and right margin pixels. A block of pixels to be used by the horizontal processing comprises one (1) line in height and (n) pixel in width, where (n) equals the number of filter's coefficients. In this embodiment, the block of pixels consists of eight pixels that are aligned in the horizontal direction starting at the leftmost pixel of the first vertically processed line, which includes the left margin pixels and at least the leftmost pixel of the first vertically processed line of the quadrangle digital image. In this example, the width of the left margin and right margin is four pixels each. Hence, the first line of the left margin pixels comprises four pixels that are generated on-the-fly from the leftmost pixel of the first vertically processed line of the quadrangle digital image, as it is read-in and stored in the second buffer. Similarly, the right margin pixels comprises four pixels that are generated on-the-fly from the rightmost pixel of the first vertically processed line of the quadrangle digital image, as it is read-in and stored in the second buffer.

In accordance with one embodiment, the processing in the horizontal direction starts by using the video data information of a block of eight pixels starting at the leftmost pixel of the first vertically processed line that is stored in the second buffer. The resultant vertically and horizontally processed video data information corresponds to the first vertically and horizontally processed pixel of the first vertically and horizontally processed line. The vertically and horizontally processed video data information is streamed to the output one pixel at a time. The horizontal processing now repeats using a new block of eight pixels that are immediately to the right of the previously processed block. The resultant vertically and horizontally processed video data information corresponds to the second vertically and horizontally processed pixel, and so on. Furthermore, the upsampling filter's coefficients may be rotated or changed so that new vertically and horizontally processed pixels are generated from the same block of eight pixels. The horizontal processing continues to shift the block of eight pixels in the horizontal direction and to the right of the previously processed block until the rightmost pixel of the first vertically processed line that is stored in the second buffer is reached. In this example, this includes the four right margin pixels. Hence, the last vertically and horizontally processed video data information for the last vertically and horizontally processed pixel of the first vertically and horizontally processed line is generated and streamed to the output. The processing in the horizontal direction now repeats by using the video data information of the second vertically processed line that is stored in the second buffer along with the left and right margin pixels. The vertically and horizontally processed video data information for the second vertically and horizontally processed line is generated and streamed out one pixel at a time. The horizontal processing continues to operate on newly generated vertically processed lines that are stored in the second buffer.

In accordance with one embodiment, the vertically and horizontally processed video data information stream comprises video data information of supplementary pixels due to the additional processed pixels of the left, top, right and bottom wings and the left, top, right and bottom margins. It is clear that the video data information of supplementary pixels should not be displayed and only the vertically and horizontally processed video data information, which correspond to the region of the captured digital image to be processed, is to be displayed in accordance with the desired display region resolution. Therefore, a data enable signal is generated that is synchronized to the vertically and horizontally processed video data information stream, and is simultaneously outputted with the output video data information stream to the display region. The display region makes use of the assertion of the data enable signal to display at least one pixel, whereas the de-assertion of the first data enable signal is used to blank at least one pixel.

In order to keep a clear description of the inventive concepts of the current disclosure, the inclusion or description of some registers, control, synchronization, video formatting circuitry and components may either be previously disclosed or omitted. The following paragraphs will further describe in details the inventive concepts with reference to the attached figures FIG. 1, FIG. 2A-FIG. 2J, and U.S. patent application Ser. No. 12/800,266 and Ser. No. 12/655,769 that are incorporated herein by reference in their entirety.

A partial block diagram for an exemplary output display module (ODM) 100 is shown in FIG. 1. Some of the operation of the ODM 100 will be expressed to describe the inventive concepts of this disclosure. Memory Data Path 131 is a bus that couples the First Buffer and Control 141_10 module to (i) a memory device or (ii) a memory controller that is coupled to a memory device. The detailed operations of the memory device and memory controller are described previously and thus are omitted here to avoid repetition of such information. The First Buffer and Control 141_10 module's main function is to fetch from memory and store as needed the video data information of pixels that have been defined as part of a first quadrangle digital image to be processed. The First Buffer and Control 141_10 is also coupled to a Vertical Processing 141_11 module, where the video data information stored in the First Buffer and Control 141_10 are processed in the vertical direction. The vertically processed video data information is outputted and stored in the Second Buffer and Control 141_12. A Horizontal Processing 141_13 module accesses and retrieves from the Second Buffer and Control 141_12 the vertically processed video data information, which in turn is processed in the horizontal direction. The Horizontal Processing 141_13 module outputs the vertically and horizontally processed video data information, e.g. VDI-Stream-1 141_00, in a streaming fashion to an Output Formatter 141_50 module.

Other video data information streams e.g. VDI-Stream-2 142_00 and VDI-Stream-3 143_00 are also coupled to the Output Formatter 141_50. Other video data information streams, not shown in FIG. 1, may also be coupled to the Output Formatter 141_50 to meet the requirements and provide the necessary flexibility to process a given digital image. In accordance with one embodiment, the VDI-Stream-1 141_00, VDI-Stream-2 142_00 and VDI-Stream-3 143_00 correspond to the vertically and horizontally processed Red, Green, and Blue components of the video data information of a given digital image or a portion thereof. In accordance with another embodiment, the VDI-Stream-1 141_00, and VDI-Stream-2 142_00 correspond to the vertically and horizontally processed Y and UV components of the video data information of a given digital image or a portion thereof. The VDI-Stream-3 143_00 correspond to an additional video data information that is to be blended, manipulated, formatted, processed and/or combined with the VDI-Stream-1 141_00 and VDI-Stream-2 142_00 to generate the output video data information stream OVDI-Stream 141_51.

Consequently, the Output Formatter 141_50 manages the processing of one or multiple video data information streams to generate and output onto Output Data Path 146 an output video data information stream OVDI-Stream 141_51 and a data enable signal Data Enable 141_52 that is synchronized to the output video data information stream OVDI-Stream 141_51. The Data Enable 141_52 signal is either asserted or de-asserted, within the time allotted to each pixel's video data information, to indicate whether the correspondent pixel should be displayed or blanked. For example, Display Region 141_60 utilize the assertion of the Data Enable 141_52 signal to display the video data information of a correspondent pixel onto the Display Region 141_60. Whereas, the de-assertion of the Data Enable 141_52 signal is used to blank a correspondent pixel from being displayed onto the Display Region 141_60.

Furthermore, Registers and Control 141_40 module is coupled to a Control Data Path 121, First Buffer and Control 141_10, Vertical Processing 141_11, Second Buffer and Control 141_12, Horizontal Processing 141_13, and Output Formatter 141_50 modules. Registers and Control 141_40 module enable the proper and smooth operation of all the modules of the output display module ODM 100 by providing information or control signals as may be required for each of the module's operation. The Registers and Control 141_40 module comprises programmable registers that are accessed, either read or written, via the Control Data Path 121 as well as each of the First Buffer and Control 141_10, Vertical Processing 141_11, Second Buffer and Control 141_12, Horizontal Processing 141_13, and the Output Formatter 141_50. For example, some programmable registers would comprise information that corresponds to the width and height of a given quadrangle digital image to be processed by output display module ODM 100. Other programmable registers may comprise location information of the first starting pixel of the Quadrangle Digital Image 210 within the Digital Image 200, and/or memory location information that corresponds to where the video data information of the first starting pixel of the Quadrangle Digital Image 210 is stored or located. Other programmable registers may comprise yet other type of information that would allow ODM 100 to interface directly with a specific memory device or through a memory controller. As has been disclosed previously, other types of information may be used such as handshaking or operational control. Therefore, the Registers and Control 141_40 is accessed to provide and receive information and control signals from and to all of ODM 100 sub-modules or other module within a Digital Image Processing System to maintain a proper hierarchical operation of two or more output display modules.

One way to look at the output display module ODM 100 architecture is that on one side it interfaces with a memory centric system Memory Interface 198 where the video data information of captured digital images to be processed are stored. On the other side, it interfaces with electronic display panel systems where the processed video data information are to be received in a streaming fashion Streaming Output 199 and displayed live as soon as the video data information is received. The Second Buffer and Control 141_12 provides an important role in balancing the operational requirements of the electronic display panel to continuously receive the OVDI-Stream 141_51 and the memory system transferring of the requested video data information to the First Buffer and Control 141_10 in bursts or blocks within a given time period. Furthermore, various video standards may require maintaining and designing appropriate control and processing sub-systems so that the processed video data information is displayed appropriately, and hence will not be discussed in this disclosure as not to obscure the description of the inventive concepts. The following paragraphs would disclose in further details the detailed operation of the output display module in relation to the exemplary models and graphical representations shown in FIG. 2A through FIG. 2J.

Figure 2A:
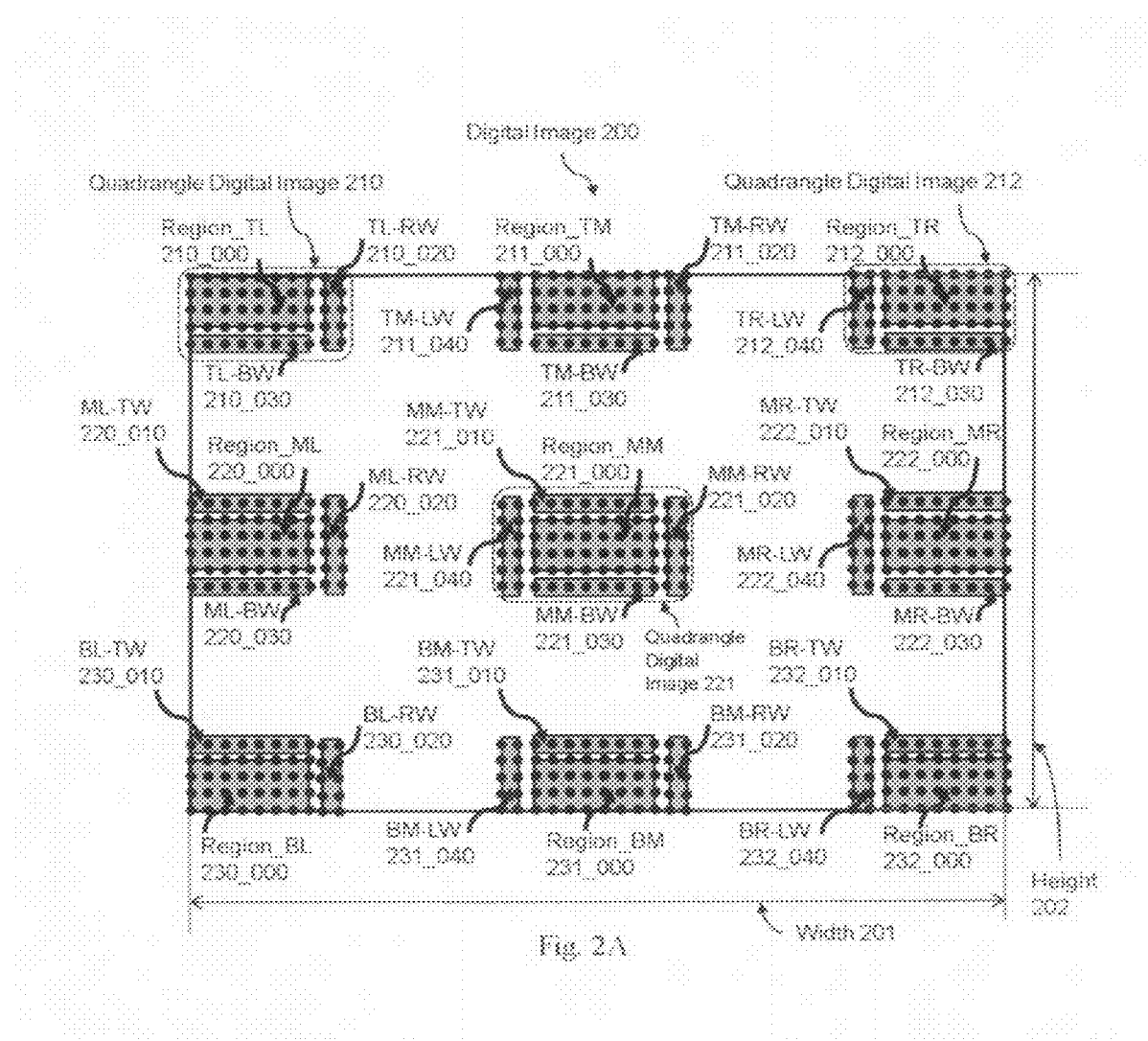
FIG. 2A shows an exemplary model of a digital image, where multiple regions within the digital image are defined to be independently processed and displayed in accordance with one embodiment.

An exemplary model depicting a digital image 200 using pixels arranged as a two-dimensional grid is shown in FIG. 2A. The digital image 200 is defined as having a Width 201 and a Height 202, in unit of pixel. The Height 202 can also be expressed in unit of lines, where each line possesses a height of one pixel. The resolution of Digital image 200 is therefore the Width 201 times the Height 202 in pixels. In accordance with one embodiment, the exemplary Digital Image 200 is to be split into multiple regions. Each region is to be processed or scaled from its original resolution to a target resolution. Each of the processed or scaled regions is to be displayed in the same order as in the original Digital Image 200, such that the display of all the processed regions would seems as if Digital Image 200 was processed or scaled contiguously from its original resolution to the target resolution. In accordance with one embodiment, the vertical and horizontal scaling factors have the same value such that the target or scaled resolution of Digital Image 200 has the same aspect ratio as the original resolution of Digital Image 200. In accordance with another embodiment, the vertical and horizontal scaling factors can possess different values, where each scaling value can be an integer or a fraction. Consequently, vertical or horizontal distortion is introduced, and the scaled digital image resolution will possess different aspect ratio then the aspect ratio of original digital image. In the following paragraphs, some of the inventive concepts are described using one exemplary region of Digital Image 200 to be processed and, for simplicity, scaled using a horizontal and vertical scaling factor of two.

In accordance with one embodiment, a quadrangle digital image is defined to comprise an individually delineated region comprising a finite number of pixels of digital image 200, along with adjacent regions that are defined as wings comprising neighboring pixels. The wings' pixels can also be defined as part of one or more neighboring quadrangle digital images. Furthermore, the vertical and horizontal comprise upsampling filters that are used as part of the scaling operation. Each vertical and horizontal upsampling filter operates on the video data information of a block of pixels that are collinear or aligned either in the vertical or in the horizontal direction, respectively. The upsampling filter's number of coefficients determines the number of pixels that are used in each block. The vertical upsampling filter operates on a block of pixels that are aligned in the vertical direction to generate a vertically processed video data information for a new vertically processed pixel. Similarly, the horizontal upsampling filter operates on a block of pixels that are aligned in the horizontal direction to generate horizontally processed video data information for a new horizontally processed pixel.

Throughout this disclosure it is assumed that the processing of pixels starts at the top-left corner (leftmost pixel of the first line) and progresses toward the end of the first line. The processing repeats with the leftmost pixel of the second line and progresses toward the rightmost pixel of the second line, and so on until the processing of all the pixels is completed. In addition, a systematic labeling of regions and pixels is applied so that it is easier to follow and understand. For example, the right wing of the top-left quadrilateral digital image label is abbreviated to TL-RW, and so on. In addition, the first three digits of the identification number correspond to the quadrangle digital image being processed. The second three digits are used to indicate the original or unprocessed quadrilateral digital image region, e.g. 000. A second three digits of 1xx is used when vertical processing is applied, and 2xx is used when horizontal processing is applied to a given region, and 9xx is used for timing points of data enable signals. All wing regions have a second three digits that starts at (010) for a given top wing region and increasing by a value of (010) in a clockwise direction. For example, the labeling of the second three digits for the right, bottom, and left wings are (020), (030), and (040). All margin regions have a second three digits that starts at (060) for a given top margin region and increasing by (010) in a clockwise direction, e.g. right margin (070), bottom margin (080), and left margin (090). A two or three digits suffix is used to indicate the pixel sequential number within a group of pixels forming a region. Please note that sometimes it may become necessary to add, change, or deviate from this labeling system.

In accordance with one embodiment, exemplary quadrilateral and wing regions are grouped and defined as quadrilateral digital images, within the Digital Image 200 and as shown in FIG. 2A. These quadrilateral and wing regions are delineated using a solid line encircling a shaded area comprising solid circles. Each solid circle represents a pixel being encompassed within each delineated region. Pixels exist outside of the shown delineated regions of Digital Image 200 but are omitted in FIG. 2A for clarity. Exemplary quadrilateral region comprising thirty-two pixels are shown to have eight pixels in width and four pixels in height. Each of these regions outlines a portion of Digital Image 200 that is to be independently processed in the vertical and horizontal direction. These exemplary quadrilateral regions are labeled as Region_TL 210_000, Region_TM 211_000, Region_TR 212_000, Region_mL 220_000, Region_mM 221_000, Region_MR 222_000, Region_BL 230_000, Region_BM 231_000, and Region_BR 232_000.

Some exemplary quadrilateral regions comprising eight pixels are defined as top or bottom wings as applicable for each quadrilateral digital image. These top or bottom wings are labeled as shown in FIG. 2A and are defined as having a width of eight pixels and a height of one pixel. The exemplary top wings are labeled as ML-TW 220_010, MM-TW 221_010, MR-TW 222_010, BL-TW 230_010, BM-TW 231_010, and BR-TW 232_010. Exemplary bottom wings are labeled as TL-BW 210_030, TM-BW 211_030, TR-BW 212_030, ML-BW 220_030, MM-BW 221_030, MR-BW 222_030. Exemplary quadrilateral regions comprising ten pixels are defined as left or right wings as applicable for each quadrilateral digital image. These left or right wings are labeled as shown in FIG. 2A and are defined as having a width of two pixels and a height of five pixels. Exemplary right wings are labeled as TL-RW 210_020, TM-RW 211_020, ML-RW 220_020, MM-RW 221_020, BL-RW 230_020, and BM-RW 231_020. Exemplary left wings are labeled as TM-LW 211_040, TR-LW 212_040, MM-LW 221_040, MR-LW 222_040, BM-LW 231_040, and BR-LW 232_040. The width and height of the wings' regions is determined in part by the number of coefficients of the vertical and horizontal upsampling filters used. Each quadrilateral region is surrounded, where applicable, with a top, right, bottom and left wings, as shown in FIG. 2A. Furthermore, each quadrilateral region along with its applicable top, right, bottom, and left wings are grouped and defined as a quadrangle digital image that is processed independently in the vertical and horizontal direction.

In accordance with one embodiment, an exemplary Quadrangle Digital Image 210 comprises the quadrilateral region Region_TL 210_000, which is located on the top-left corner of Digital Image 200, a right wing TL-RW 210_020 and a bottom wing TL-BW 210_030. The top edge of the quadrilateral region Region_TL 210_000 is collinear with the top edge of Digital Image 200. Similarly, the left edge of the quadrilateral region Region_TL 210_000 is collinear with the left edge of Digital Image 200. Thus, a top or left wings regions cannot be delineated using pixels that exist within Digital Image 200. The Quadrangle Digital Image 210, as shown in FIG. 2A, has a width of ten pixels and a height of five pixels, thus an overall resolution of fifty pixels.

In accordance with yet another embodiment, an exemplary quadrangle digital image 212 comprises the quadrilateral region Region_TR 212_000, which is located on the top-right corner of Digital Image 200, a left wing TR-LW 212_040 and a bottom wing TR-BW 212_030. The top edge of the quadrilateral region Region_TR 212_000 is collinear with the top edge of Digital Image 200. Similarly, the right edge of the quadrilateral region Region_TR 212_000 is collinear with the right edge of Digital Image 200. Thus, a top or right wings regions cannot be formed using pixels that exist within Digital Image 200. The quadrangle digital image 212, as shown in FIG. 2A, has a width of ten pixels and a height of five pixels, thus an overall resolution of fifty pixels.

In accordance with another embodiment, an exemplary quadrangle digital image 221 comprises the quadrilateral region Region_MM 221000, which is located within the boundaries of the Digital Image 200, surrounded by top, right, bottom, and left wing regions, namely MM-TW 221_010, MM-RW 221_020, MM-BW 221_030, and MM-LW 221_040. The quadrangle digital image 221, as shown in FIG. 2A, has a width of twelve pixels and a height of six pixels, thus an overall resolution of seventy-two pixels.

The location of a given quadrilateral digital image determines the applicable wings that can be used to form a corresponding quadrangle digital image to be processed. Therefore, each quadrangle digital image may comprise a different resolution from neighboring quadrangle digital images, as shown in FIG. 2A. In addition, for a given digital image processing system that is capable of processing at a higher resolution, a given quadrangle digital image to be processed can be defined as the concatenation of multiple quadrilateral regions and wings within the Digital Image 200. Furthermore, the generated vertically and horizontally processed pixels that are due to the additional wing regions must be removed as a final processing step before streaming out the vertically and horizontally processed video data information. Alternatively, these additional pixels may be blanked during the displaying phase. In the following paragraphs, Quadrangle Digital Image 210 is used to further describe in details the vertical and horizontal processing of the video data information of Quadrangle Digital Image 210.

Figure 2B:
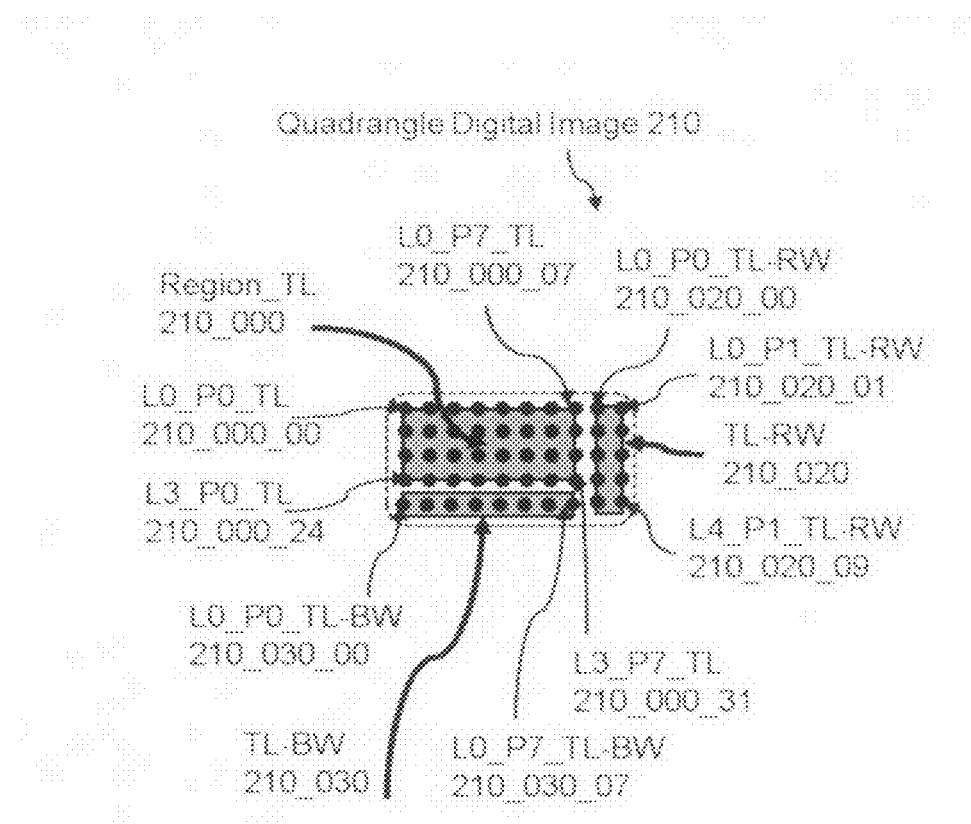
FIG. 2B shows an exemplary model of a quadrangle digital image that is defined, in accordance with one embodiment, using the top left region of the digital image of FIG. 2A along with a right wing and a bottom wing.

An exemplary model depicting quadrilateral region Region_TL 210_000 that represents a portion of Digital Image 200 to be processed in the vertical and horizontal direction is shown in FIG. 2B. A Quadrangle Digital Image 210 comprises three delineated regions of Digital Image 200. The first region is the quadrilateral region Region_TL 210_000 having a width of eight pixels and a height of four pixels. The second region is the right wing TL-RW 210_020 having a width of two pixels and a height of five pixels. The third region is the bottom wing TL-BW 210_030 having a width of eight pixels and a height of one pixel. A scaling factor of two will be used; hence, the quadrilateral digital image Region_TL 210_000 will be processed in the vertical and horizontal direction to twice its original resolution.

The first starting pixel L0_P0_TL 210_000_00 of Region_TL 210_000 is the top-left corner pixel or the leftmost pixel of the first line, which in this case happens to coincide with the starting pixel of Digital Image 200. Therefore, the first starting pixel L0_P0_TL 210_000_00 location information comprise an offset of zero in both the vertical and horizontal directions with respect to the location of the first starting pixel of Digital Image 200. The last pixel of the first line L0_P7_TL 210_000_07 of Region_TL 210_000 is immediately to the left of the leftmost pixel L0_P0_TL-RW 210_020_00 of the first line of the right wing TL-RW 210_020, as shown in FIG. 2B. The first pixel of the fourth line L3_P0_TL 210_000_24 of Region_TL 210_000 is immediately above the leftmost pixel L0_P0_TL-BW 210_030_00 of the first line of the bottom wing TL-BW 210_030. Similarly, The last pixel of the fourth line L3_P7_TL 210_000_31 of Region_TL 210_000 is immediately above of the rightmost pixel L0_P7_TL-BW 210_030_07 of the first line of the bottom wing TL-BW 210_030. The rightmost pixel of the first line of the right wing TL-RW 210_020 is labeled as L0_P1_TL-RW 210_020_01, and the rightmost pixel of the fifth line of the right wing TL-RW 210_020 is labeled as L4_P1_TL-RW 210_020_09, as shown in FIG. 2B.

Figure 2C:
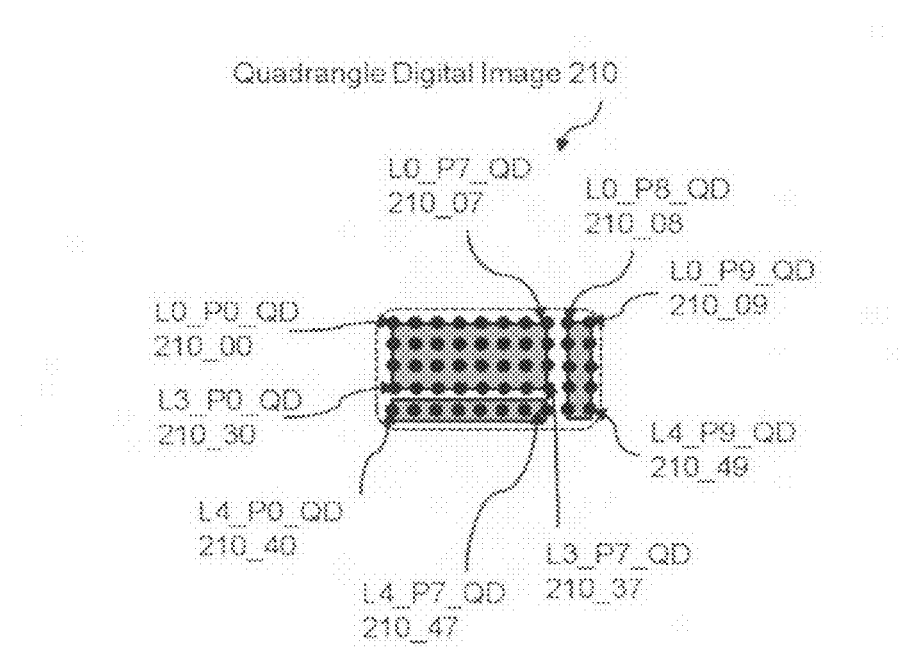
FIG. 2C shows another model representing the exemplary quadrilateral digital image of FIG. 2B in accordance with another embodiment.

In accordance with one embodiment and although Quadrangle Digital Image 210 comprises three delineated regions of Digital Image 200, memory read transactions initiated by First Buffer and Control 141_10 are performed as if Quadrangle Digital Image 210 is one contiguous region. Quadrangle Digital Image 210 is shown in FIG. 2C having a width of ten pixels, a height of five lines. Each pixel's location number within Quadrangle Digital Image 210, e.g. _00 through _49, is used as the suffix for each pixel's label. Horizontal lines are labeled using an abbreviation of L0 through L4. For example, the first starting pixel and the last pixel are labeled as L0_P0_QD 210_00 and L4_P9_QD 210_49, respectively, and are the same pixels as labeled L0_P0_TL 210_000_00 and L4—P1_TL-RW 210_020_09 as shown in FIG. 2B. All pixels of Quadrangle Digital Image 210 are illustrated while preserving the distinctive shading and delineation of the right and bottom wings regions as shown in FIG. 2C. This distinctive shading and delineation will be maintained for clarity in all parts of FIG. 2D through FIG. 2H so that when the vertical and horizontal processing is applied, then some of the processed pixels that are generated as a result of the added pixels, e.g. pixels of added wings or margins, can be graphically shown. Details of the vertical scaling operation and the generation of top and bottom margin pixels are described in the following paragraphs.

In accordance with one embodiment, the processing in the vertical direction of Quadrangle Digital Image 210 starts when the First Buffer and Control 141_10 generates a first memory read command, which initiates at least a first memory read transaction, to receive the video data information of Quadrangle Digital Image 210 from a memory device. As previously disclosed, a first memory read command comprises various types of information that are used by a memory controller and/or directly by the memory device to locate, fetch, and transfer to the First Buffer and Control 141_10 the requested video data information. The First Buffer and Control 141_10 comprises a first buffer that can hold all or a portion of the received video data information of Quadrangle Digital Image 210. Furthermore, the First Buffer and Control 141_10 comprises control circuitry that can throttle, if necessary, the transfer or reception of the requested video data information into the first buffer to meet its own vertical processing and performance requirements. Subsequently, one or multiple memory transfer may occur, in response to one or more memory read command, until all of the requested video data information of Quadrangle Digital Image 210 is received into the first buffer. The Vertical Processing 141_11 module fetches the video data information content of the first buffer and operates on the video data information in the vertical direction using a predefined number of pixels at a time. The resultant vertically processed video data information is transferred out of the Vertical Processing 141_11 module and into a Second Buffer and Control 141_12 module, where it is stored for subsequent processing in the horizontal direction.

Figure 2D:
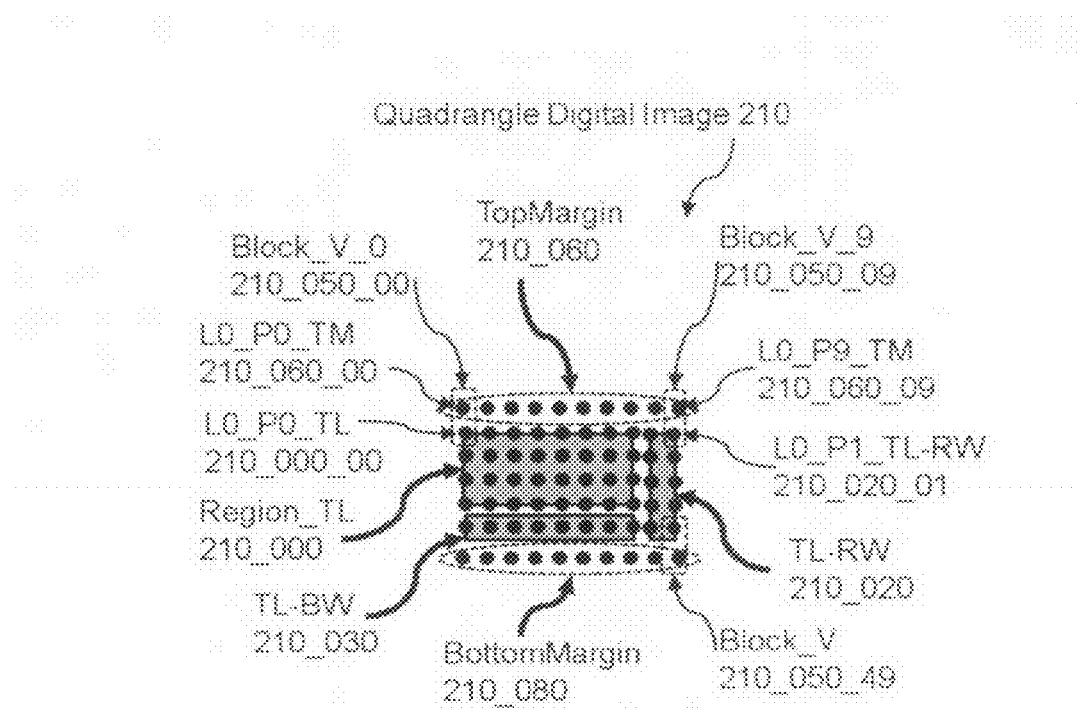
FIG. 2D shows the exemplary model of the quadrilateral digital image of FIG. 2B supplemented with top margin and bottom margin pixels, in accordance with one embodiment.

The Vertical Processing 141_11 module comprises circuitry to perform the vertical processing operation of the video data information stored in the first buffer of the First Buffer and Control 141_10 using a vertical scaling factor information that is stored in a register and in this example is equals two. An upsampling filter is used to perform the scaling operation and is designed to meet the required scaling and system design specifications. In accordance with one embodiment, First Buffer and Control 141_10 comprises circuitry to generate top and/or bottom margin pixels as necessary to be used by the upsampling filter for the vertical processing operation. Exemplary top and bottom margin regions having a width of ten pixels and a height of one pixel, namely TopMargin 210_060 and BottomMargin 210_080, are shown in FIG. 2D. The height of the TopMargin 210_060 and/or BottomMargin 210_080 is determined in part by the upsampling filter's number of coefficients. Similarly, the height of the applicable wing regions, e.g. the bottom wing region TL-BW 210_030, is determined in part by the upsampling filter's number of coefficients.

In accordance with one embodiment, First Buffer and Control 141_10 comprises circuitry to generate on-the-fly the pixels of TopMargin 210_060 by replicating the video data information of the first line of the Quadrangle Digital Image 210 while it is being received from memory to be stored into the first buffer. Thus, the first buffer now comprises a first line of pixels defined as the TopMargin 210_060 and a second line of pixels that is the first line of Quadrangle Digital Image 210, which in this case are identical. The replication process, may be an exact copy or a processed copy of the video data information of the first line of Quadrangle Digital Image 210 as it being retrieved from memory, or a predetermined video data information that may correspond to a particular color. Similarly and in turn, the video data information of the last line Quadrangle Digital Image 210 is replicated once as it is being received, and is stored as the last line of the first buffer and comprises the video data information of the BottomMargin 210_080 pixels. If the height requirement of the top and bottom margins changes, then the replication process is modified to produce as many lines of pixels as may be required. For example if a margin height of two pixels is determined, then the replication process generates a first and a second line of pixels that are a replica of the first line of Quadrangle Digital Image 210. Throughout this disclosure, the graphical representation of the margin pixels, e.g. the TopMargin 210_060 and BottomMargin 210_080, are solid circles without any background shading, as shown in FIG. 2D through FIG. 2H. In this example, the leftmost pixel L0_P0_TM 210_060_00 of the TopMargin 210_060 is a replica of the leftmost pixel L0_P0_TL 210_000_00 of the first line of Quadrangle Digital Image 210. Similarly, the rightmost pixel L0_P9_TM 210_060_09 of the TopMargin 210_060 is a replica of the rightmost pixel L0_P1_TL-RW 210_020_01 of the first line of the right wing region TL-RW 210_020, as shown in FIG. 2D. Please note that the rightmost pixel L0_P1_TL-RW 210_020_01 is considered the last pixel of the first line of the Quadrangle Digital Image 210.

There exist a large variety of video data information filters that are known in the art, as well as many applications using them. A simple and brief description of a one-dimension three coefficients filter is introduced here as an example. The filter operates on a block of three pixels at a time. These three pixels are defined as the filter's input pixels and can be aligned in the vertical or horizontal direction. The exemplary filter produces video data information for one new processed pixel by operating and applying one coefficient for each pixel's video data information. Typical values for an exemplary three coefficients may be [C1=0.25, C2=0.5, and C3=0.25], where the video data information of the exemplary filter output pixel may be represented mathematically as shown in eq. 1.

$$P\text{out}_m = C1 * P\text{in}_{n-1} + C2 * P\text{in}_n + C3 * P\text{in}_{n+1} \qquad \text{eq. 1}$$

Pout represents the video data information for an output pixel, and Pin represents the video data information for an input pixel. Subscript (m or n) represent a defined location either in the vertical or horizontal direction, i.e. a line number or a pixel number within a line of pixels. Please note that in the case of vertical processing (m and n) in eq. 1 represents the line number location of the output pixel and the three input pixels that are aligned in the vertical direction. The video data information of the output pixel of line (m) is the resultant video data information addition operation of 25% of the pixel of line (n-1), 50% of the pixel of line (n), and 25% of the pixel of line (n+1). An effective way to generate a new $P\text{out}_{m+1}$ using the same input pixels is by changing the coefficients, e.g. [C1=0.5, C2=0.25, and C3=0.25], as shown in eq. 2.

$$P\text{out}_{m+1} = C1 * P\text{in}_{n-1} + C2 * P\text{in}_n + C3 * P\text{in}_{n+1} \qquad \text{eq. 2}$$

In the above example, a simple rotation of the coefficients will results in $P\text{out}_{m+1}$ where the new first coefficient C1 (0.5) equals the old second coefficient C2 (0.5). A third pixel may be generated using another rotation of the same coefficients, i.e. [C1, C2, and C3]. In the case of horizontal processing (m or n) represents the pixel's location within a given line, hence the three pixels that are aligned in the horizontal direction are horizontally processed and new horizontally processed pixels are generated in a similar fashion as described above.

Figure 2E:
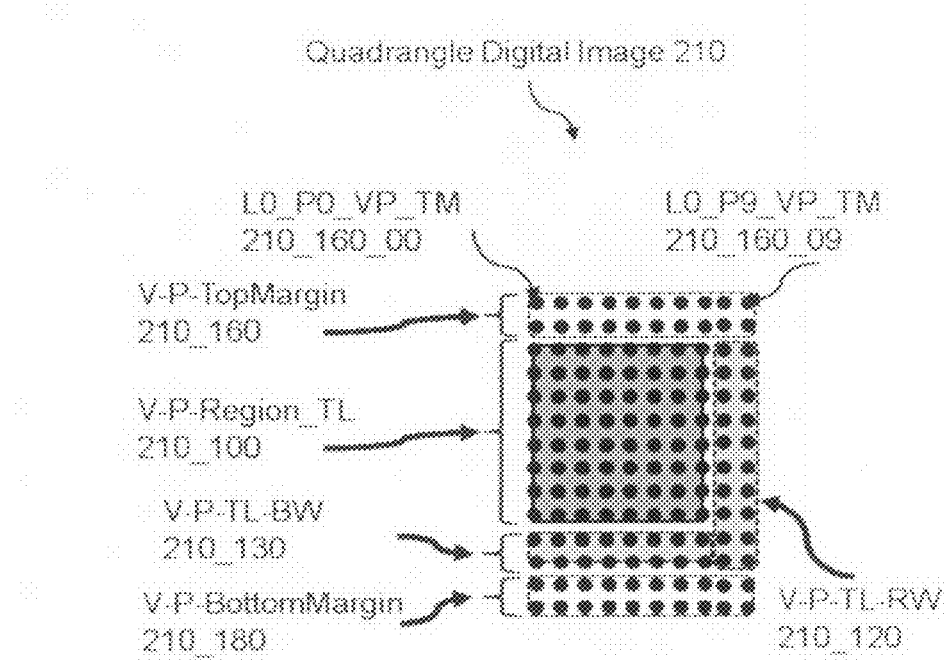
FIG. 2E shows an exemplary model representing digital image processing in the vertical direction for the quadrilateral digital image of FIG. 2D in accordance with one embodiment.

In the following paragraphs, it will be assumed that a two-coefficient upsampling filter is used to process Quadrangle Digital Image 210 that comprises five lines having ten pixels each, one line of TopMargin 210_060 pixels and one line of BottomMargin 210_080 pixels, as shown in FIG. 2D. Therefore, a total of seven lines and each line having ten pixels are to be vertically processed. In this example, since Quadrangle Digital Image 210 is to be scaled up two times its original resolution, then the vertical processing produces twice as many output lines as there are input lines, as shown in FIG. 2E, fourteen lines and each line having ten pixels. The shaded regions of FIG. 2E correspond to the vertically processed Quadrangle Digital Image 210 region that comprises V-P-Region_TL 210_100 having eight lines, V-P-TL-BW 210_130 having two lines. In addition, two lines each for V-P-TopMargin 210_160 and V-P-BottomMargin 210_180 are produced so that the total number of lines produced by Vertical Processing 141_11 module is fourteen. The resultant vertically processed video data information for each new vertically processed pixel is transferred out of the Vertical Processing 141_11 module and into a Second Buffer and Control 141_12 module, where it is stored for subsequent processing in the horizontal direction.

An exemplary vertical processing operates starting at the leftmost pixels and progresses to the rightmost pixels of two input lines, using two vertically aligned pixels at a time. A block of two pixels Block_V_0 210_050_00 to be processed in the vertical direction, as shown in FIG. 2D, comprises the leftmost pixel L0_P0_TM 210_060_00 of TopMargin 210_060 and leftmost pixel L0_P0_TL 210_000_00 of the first line (L0) of Quadrangle Digital Image 210. This process continues until the rightmost pixels are reached forming Block_V_9 210_050_09 that comprises the rightmost pixel L0_P9_TM 210_060_09 of the TopMargin 210_060 and rightmost pixel L0_P1_TL-RW 210_020_01 of the first line of the right wing TL-RW 210_020. Once the upsampling of the input pixels of the first and second line is completed, then the vertical processing continues by sliding the block of two pixels down one line and starting at the leftmost pixels of the second and third line (L0 and L1) of Quadrangle Digital Image 210. The vertical processing progresses until the rightmost pixels of L0 and L1 are reached, and so on until the last block of two pixels Block_V 210_050_49 is vertically processed and thus completing the vertical processing of Quadrangle Digital Image 210, the TopMargin 210_060, and BottomMargin 210_080.

A graphical representation model for the above vertically processed pixels is shown in FIG. 2E. The resultant vertically scaled top margin V-P-TopMargin 210_160 now comprises two vertically processed lines, each line comprising ten pixels. Similarly, the resultant vertically scaled bottom margin V-P-BottomMargin 210_180 now comprises two vertically processed lines, each line comprising ten pixels, hence a total of fourteen vertically processed lines. Various regions are graphically distinguished using shaded background for the three regions of Quadrangle Digital Image 210. Specifically, V-P-Region_TL 210_100, V-P-TL-BW 210_130, and V-P-TL-RW 210_120 each of which corresponds to the vertically processed region of Region_TL 210_000, TL-BW 210_030, and TL-RW 210_020, respectively. In addition, clear background is used for V-P-TopMargin 210_160 and V-P-BottomMargin 210_180.

In accordance with one embodiment, the resultant vertically processed video data information is transferred out of the Vertical Processing 141_11 module and into the Second Buffer and Control 141_12 module, where it is to be stored in a second buffer along with newly generated video data information for left and right margin pixels. The left and right margin pixels are generated on-the-fly in a similar way as described earlier for the top and bottom margin pixels. The Horizontal Processing 141_13 module fetches the vertically processed video data information content of the second buffer, operates on a predefined number of pixels that are aligned in the horizontal direction, and generates resultant vertically and horizontally processed video data information that is streamed one pixel at a time out of the Horizontal Processing 141_13 module. The Output Formatter 141_50 receives the vertically and horizontally processed video data information stream VDI-Stream-1 141_00 and perform further processing, blending, combining, and/or video standard format conversion prior to outputting the vertically and horizontally processed video data information stream onto Output Data Path 146, see FIG. 1.

Figure 2F:
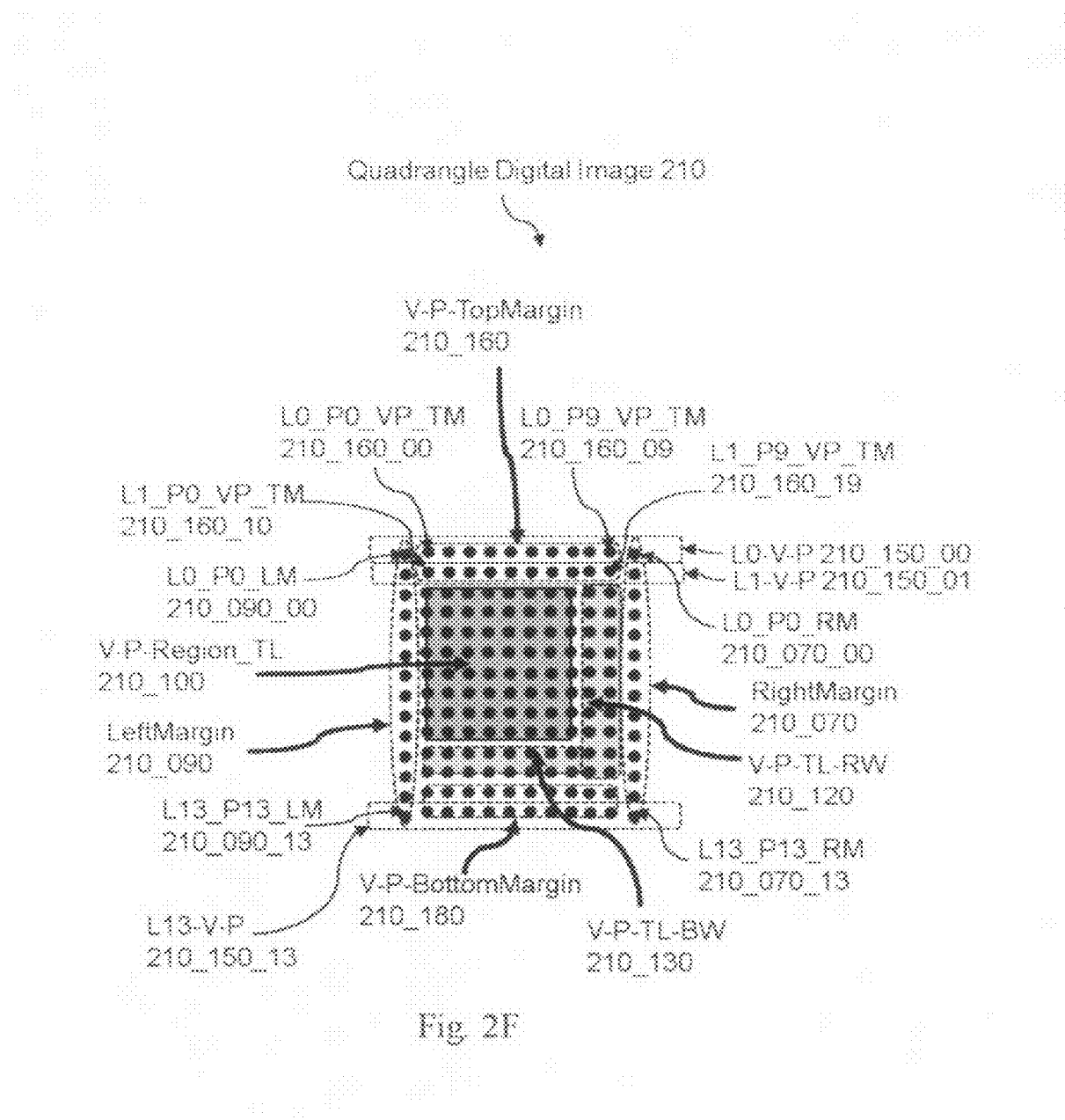
FIG. 2F shows the exemplary model of the quadrilateral digital image of FIG. 2E supplemented with right margin and left margin pixels, in accordance with one embodiment.
Figure 2C:
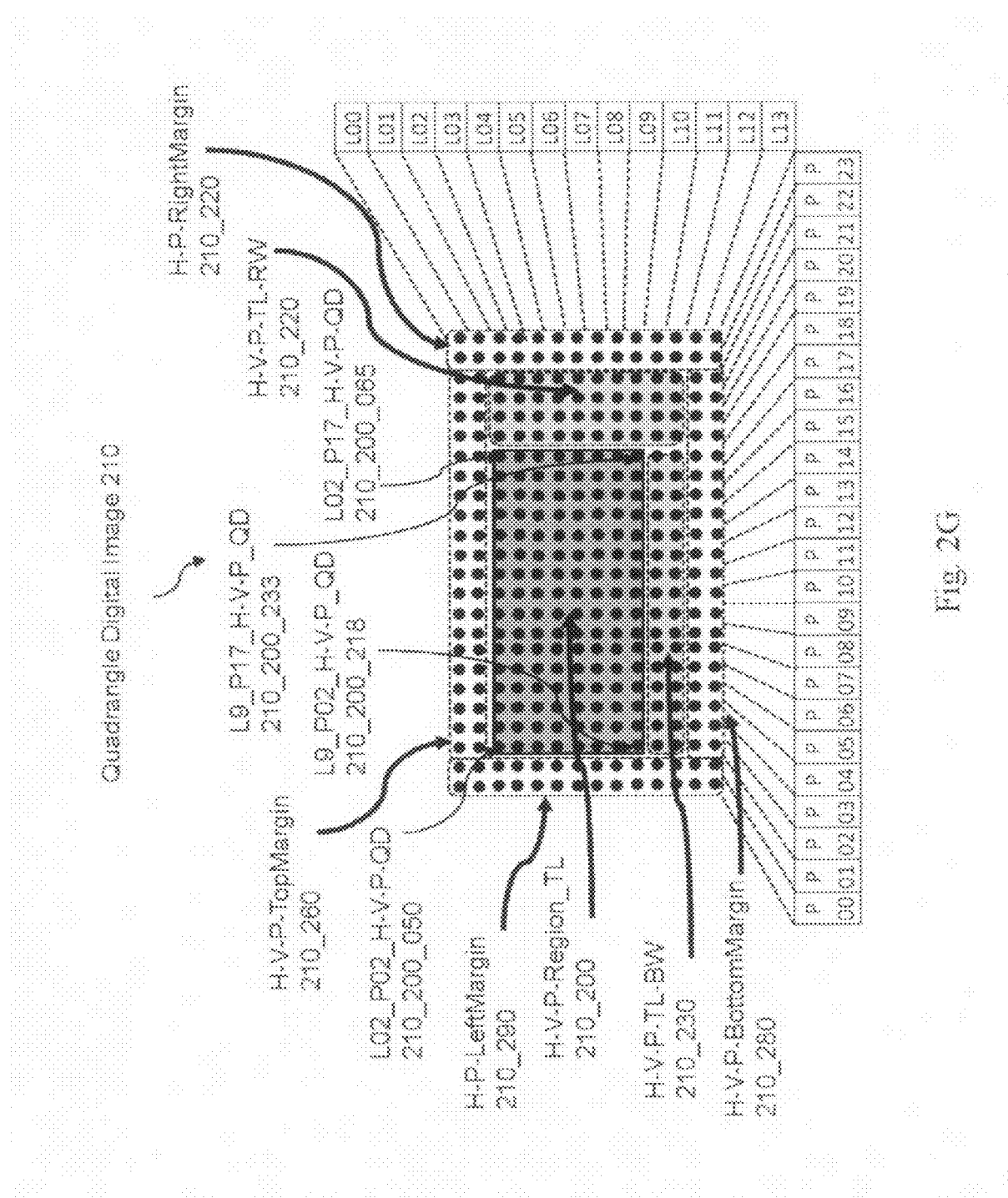
Figure 2:
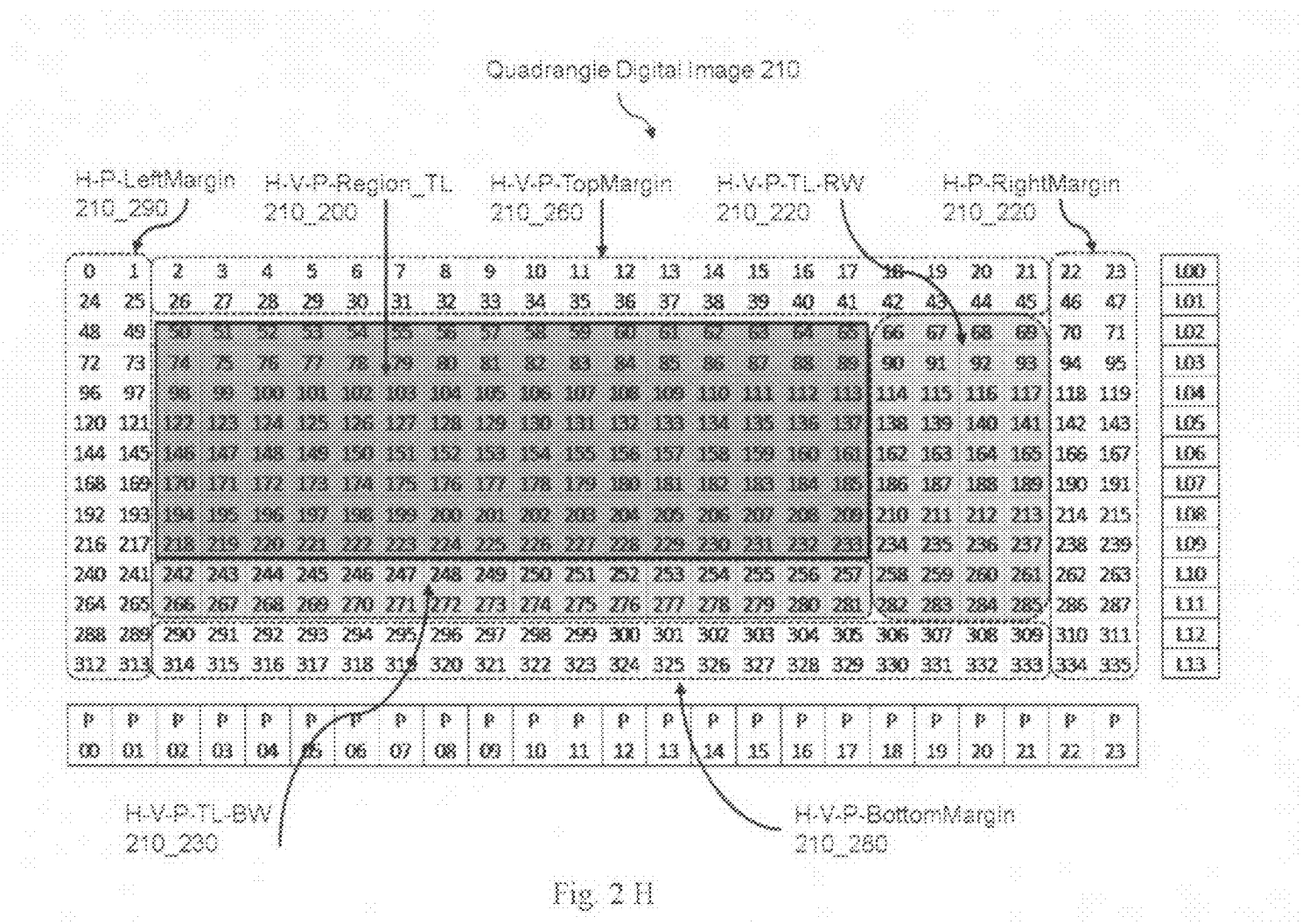

In accordance with one embodiment, the Second Buffer and Control 141_12 comprises circuitry to generate left and/or right margin pixels as necessary to be used by the upsampling filter for the horizontal scaling operation. Exemplary top and bottom margin regions having a height of fourteen lines and a width of one pixel per line, namely LeftMargin 210_090 and RightMargin 210_070, as shown in FIG. 2F. The width of the LeftMargin 210_090 and/or RightMargin 210_070 is determined in part by the upsampling filter's number of coefficients, as well as the width of the applicable wing regions, e.g. the vertically processed right wing region V-P-TL-RW 210_120. The LeftMargin 210_090 comprises a height of fourteen lines and each line having a width of one pixel, where the first line comprises the pixel L0_P0_µM 210_090_00 and the last line comprises the pixel L13_P13_LM 210_090_13. The RightMargin 210_070 comprises a height of fourteen lines and each line having a width of one pixel, where the first line comprises the pixel L0_P0_RM 210_070_00 and the last line comprises the pixel L13_P13_RM 210_070_13. The Horizontal Processing 141_13 module comprises (i) circuitry to fetch or receive the vertically processed video data information stored in the second buffer of the Second Buffer and Control 141_12 module, and (ii) the horizontal upsampling filter to perform the horizontal processing operation in accordance with the horizontal scaling value of two. This value is stored in a programmable register and can be same or different from the vertical scaling value as described above.

In this example, the horizontal upsampling filter is used to perform the scaling operation in the horizontal direction using a block of two pixels at a time starting with the first line of the vertically processed video data information L0-V-P 210_150_00, as shown in FIG. 2F. The first pixel of the first line of the LeftMargin 210_090 that is labeled as L0_P0_µM 210_090_00 and the first pixel of the first line of the vertically processed top margin that is labeled as L0_P0_VP_TM 210_160_00 constitute the first two pixels to be processed by the horizontal upsampling filter. Hence, the Horizontal Processing 141_13 module generates and streams the first vertically and horizontally processed video data information of the first vertically and horizontally processed pixel to the Output Formatter 141_50 module. Timing and design requirement are taken into account while streaming the vertically and horizontally processed video data information onto Output Data Path 146 so that an electronic display panel may properly display the streamed video data information. The horizontal upsampling filter produces the vertically and horizontally processed video data information of consecutive pixels in the horizontal direction by rotating the filter's coefficients or sliding the block of two pixels to the left one pixel at a time, in a similar way to how the vertical upsampling process is described above. When the horizontal processing of the last two pixels, namely L0_P9_VP_TM 210_160_09 and L0_P0_RM 210_070_00, of the first line of the vertically processed video data information L0-V-P 210_150_00 is completed, then twenty-four vertically and horizontally processed pixel are produced and streamed to the Output Formatter 141_50. This completes the first vertically and horizontally processed line L00 as shown in FIG. 2G. The Horizontal Processing 141_13 module continues the horizontal processing operation by fetching the vertically processed video data information of the second line L1-V-P 210_150_01 from the second buffer using two pixels at a time, and performing the horizontal upsampling operation. The horizontal processing progresses until the second vertically and horizontally processed line L01 is produced and streamed one pixel at a time to the Output Formatter 141_50, as shown in FIG. 2G. Similarly, the horizontal processing repeats until all pixels of the last vertically processed line L13-V-P 210_150_13 is completed and a vertically and horizontally processed line L13 is produced and streamed one pixel at a time to the Output Formatter 141_50.

In accordance with another embodiment, the horizontal and vertical processing is accomplished using upsampling filters having eight coefficients, and thus operates on the video data information of eight pixels at a time. It is up to the digital image-processing system designer to determine the type of upsampling processing required for a desired picture quality and/or a system's performance criteria. Furthermore, the Second Buffer and Control 141_12 comprises the second buffer that may hold, given its size, all or a portion of the vertically processed video data information of Quadrangle Digital Image 210. The Horizontal Processing 141_13 module comprises control circuitry that enables the ability to repeat the horizontal processing of a given line, a group of lines, or the entire content of the second buffer as desired. Furthermore, video effect such as rewind or freeze may be accomplished via appropriate programming or control of the Output Display Module 100 and its various components, e.g. the Registers and Control 141_10, First Buffer and Control 141_10, Vertical Processing 141_11, Second Buffer and Control 141_12, and the Horizontal Processing 141_13 modules.

In the following paragraphs, the blanking of the extra vertically and horizontally processed pixels that are produced due the added wings and/or margin pixels will be described, such that only the vertically and horizontally processed pixels that correspond to Region_TL 210 are displayed.

The exemplary vertically and horizontally processed Quadrangle Digital Image 210 is represented graphically in a first model that is shown in FIG. 2G and a second model that is shown in FIG. 2H. Each pixel is represented as a solid circle in the first model, while the actual sequential pixel number is shown in the second model. In both models, the vertically and horizontally processed regions of Quadrangle Digital Image 210 are shown using shaded background, while the vertically and horizontally processed regions of top, right, bottom, and left margin are shown using clear background. The vertically and horizontally processed region H-V-P-Region_TL 210_200 that corresponds to the Region_TL 210 is shown on FIG. 2G and comprises a height of eight lines and a width of sixteen pixels. In addition, the H-V-P-Region_TL 210_200 is delineated by a top-left corner pixel L02—P02_H-V-P-QD 210_200_050, a top-right corner pixel L02_P17_H-V-P-QD 210_200_065, a bottom-left corner pixel L9—P02_H-V-P_QD 210_200_218, and a bottom-right corner pixel L9_P17_H-V-P_QD 210_200_233. The horizontally processed right and left margin pixels, H-P-RightMargin 210_220 and H-P-LeftMargin 210_290 respectively, each of which comprise a height of fourteen lines and a width of two pixels. The vertically and horizontally processed top and bottom margin pixels, H-V-P-TopMargin 210_260 and H-V-P-BottomMargin 210_280 respectively, each of which comprise a height of two lines and a width of twenty pixels. The vertically and horizontally processed bottom wing pixels H-V-P-TL-BW 210_230 comprise a height of two lines and a width of sixteen pixels. The vertically and horizontally processed right wing pixels H—P-RightMargin 210_220 comprise a height of ten lines and a width of four pixels.

In the above example, each of the vertically and horizontally processed pixels of H-V-P-Region_TL 210_200 comprises a certain percentage of the video data information from its neighboring pixels, as determined by the upsampling filters' coefficients and described in the vertical and horizontal processing paragraphs above. The Digital Image 200 is partitioned into many quadrilateral regions, some of which are shown in FIG. 2A. These quadrilateral regions will be processed vertically and horizontally in a similar manner as Region_TL 210. Consequently, the display of the concatenation of all the vertically and horizontally processed quadrilateral regions will result in the display of a vertically and horizontally processed Digital Image 200 as if the vertical and horizontal processing was performed contiguously for each pixel of Digital Image 200. Furthermore, the excess pixels generated due to the vertical and horizontal processing must be discarded for the proper concatenation process to take place. Therefore, a Data Enable 141_52 signal that is synchronized with the vertically and horizontally processed video data information stream OVDI-Stream 141_51 will be generated in the Output Formatter 141_50 and outputted onto the Output Data Path 146. The assertion of the Data Enable 141_52 signal is used to allow the display of a corresponding OVDI-Stream 141_51 pixel that is part of Region_TL 210. Furthermore, the de-assertion of the Data Enable 141_52 will be used to discard the video data information of, i.e. to blank, a corresponding OVDI-Stream 141_51 pixel. This is graphically shown in FIG. 2I and FIG. 2J which will be described in further details below.

The vertically and horizontally processed pixels of H-V-P-Region_TL 210_200 that are to be displayed have a shaded background, and all other pixels that will not be displayed have clear background. The H-V-P-Region_TL 210_200 is delineated by a top-left corner pixel L02—P02_H-V-P-QD 210_200_050, a top-right corner pixel L02—P17—H-V-P-QD 210_200_065, a bottom-left corner pixel L9—P02_H-V-P_QD 210_200_218, and a bottom-right corner pixel L9—P17—H-V-P_QD 210_200_233, as shown in FIG. 2I. It is evident that every pixel of the first line L00, starting with the first pixel L00_P00_H-V-P-QD 210_200_000 until the twenty-fourth pixel must be discarded. Similarly, the second line L01 and the tenth through the thirteenth lines L10-L13 must be discarded. In addition, The first two pixels, P00_P02, of the third line through the ninth line, L02-L09, must also be discarded. Furthermore, the last six pixels, P18-P23, of the third line through the ninth line, L02-L09, must be discarded as well. The timing diagram of FIG. 2J will provide an exemplary association between the Data Enable 141_52 and the vertically and horizontally processed video data information stream OVDI-Stream 14151.

Figure 2J:
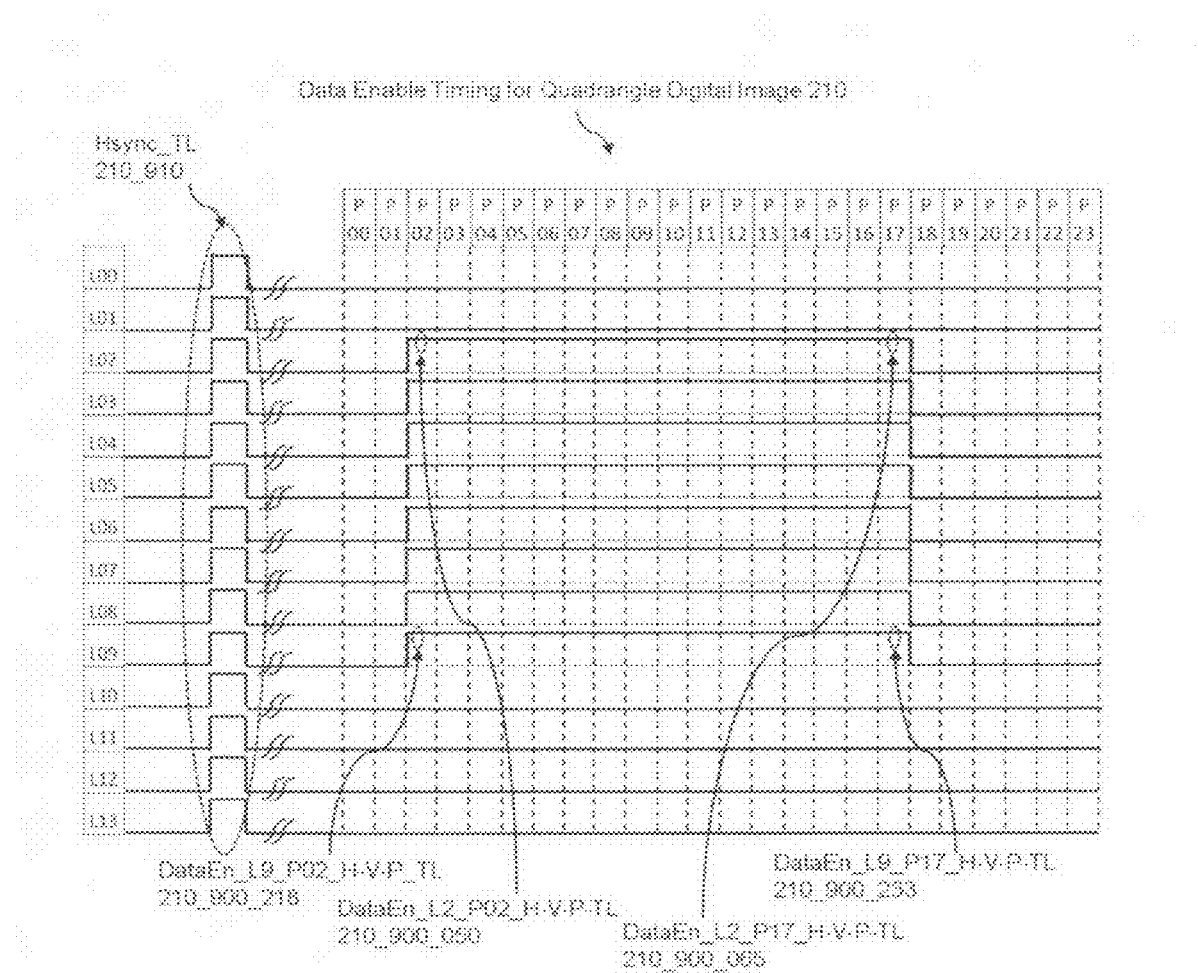
FIG. 2J shows an exemplary timing model representing Data Enable signal timing relationship to the vertically and horizontally processed output video data information stream of top-left region of the digital image of FIG. 2A in accordance with one embodiment.

Now referring to the timing diagram shown in FIG. 2J, the top row represents the vertically and horizontally processed video data information stream comprising the first pixel P00 through the twenty-fourth pixel P23 of a given vertically and horizontally processed line. The left column represents consecutive vertically and horizontally processed line L00 through L13. At the beginning of each horizontal line a synchronization pulse Hsync_TL 210_910 exist to properly keep the timing and synchronization for all pixels to be displayed on that line. A discontinuity is shown after the Hsync_TL 210_910 pulse to indicate that a certain amount of time may exist before the actual allotted time for the first pixel P00 becomes valid. In this example, P00 through P23 of the first line L00 have equally allotted time to be displayed sequentially. The assertion of the Data Enable 141_52 signal is graphically shown as high level, and the de-assertion of the Data Enable 141_52 signal is graphically shown as low level. Thus, in this example an AND logic function may be used to gate the display of the corresponding pixel. The displaying process repeats for all lines of Quadrangle Digital Image 210 sequentially L00 through L13, taking into account whether the Data Enable 141_52 is asserted or not. The timing diagram of FIG. 2J shows that the assertion of the data enable signal DataEn_L2—P02_H-V-P-TL 210_900_050 is asserted starting at P02 of L02 and de-asserted DataEn_L2_P17_H-V-P-TL 210_900_065 before P18 starts. Similarly, for the next nine lines L03 through L09. As a result, only the vertically and horizontally processed pixels that correspond to the Region_TL 210 are displayed.

An exemplary electronic display panel comprises multiple display regions where the concatenation of all display regions represents the target display resolution. An exemplary display region is Display Region 141_60, as shown in FIG. 1, receives the Data Enable 141_52 signal and the OVDI-Stream 141_51. The Display Region 141_60 utilize the assertion of the Data Enable 141_52 signal to display the video data information of a correspondent pixel onto the screen of the Display Region 141_60. Similarly, other display regions of the electronic display panel receive their respective video data information stream along with the associated data enable signal. The vertically and horizontally processed Digital Image 200 will be displayed onto the electronic display panel when all display regions display the appropriate portions of the video data information streams using the associated data enable signals.

In accordance with one embodiment, the Output Formatter 141_50 generates the Data Enable 141_52 by using counter circuitry to count the number of streamed pixels per line, and another counter circuitry to count the number of streamed lines for the vertically and horizontally processed Quadrangle Digital Image 210. In addition, the Output Formatter 141_50 receives or fetches information, from the Register and Control 141_40 module, regarding the height and width of the Region_TL 210, the target height and width or scaling factor, the height and width of applicable wings and margins regions. Thus, the Output Formatter 141_50 determines the appropriate time to assert the Data Enable 141_52, or not. Furthermore, the Output Formatter 141_50 is capable to manage the processing of one or multiple video data information streams. For example, VDI-Stream-1 141_00 and VDI-Stream-2 142_00 represent the Y-component and the UV-component of the vertically and horizontally processed video data information of Quadrangle Digital Image 210. VDI-Stream-3 143_00 represents video data information for On-Screen Display stream that is to be merged with all or a portion of the vertically and horizontally processed video data information of Quadrangle Digital Image 210. The Output Formatter 141_50 generates and outputs OVDI-Stream 141_51 and Data Enable 141_52 that are synchronized to each other and in accordance with the three video data information streams VDI-Stream-1 141_00, VDI-Stream-2 142_00 and VDI-Stream-3 143_00.

The exemplary embodiments as described in this disclosure are used to develop a scalable architecture for a Digital Image Processing System that meets a widely varying input digital image processing requirements, and provide the ability to customize the Digital Image Processing System to meet a continuously increasing size and resolution specifications for electronic display panels.

I claim:

1. A digital image processing apparatus to process video data information of a captured input digital image comprising:
    a first programmable register to store a first value that corresponds to a first width of a first quadrangle digital image, wherein the first quadrangle digital image comprises a first portion of the captured input digital image;
    a second programmable register to store a second value that corresponds to a first height of the first quadrangle digital image, wherein the first width corresponds to a first number of pixels in the horizontal direction and the first height corresponds to a first number of lines in the vertical direction;
    a third programmable register to store a third value that corresponds to a first location information of the first quadrangle digital image, wherein the first location information comprises information that corresponds to a first memory location of a memory device;
    a first logic circuitry coupled to the memory device, a first buffer, and to the first, second, and third programmable registers, and is configured to:
        (i) retrieve from the memory device a first video data information that corresponds to at least a portion of the first quadrangle digital image, in accordance with a first video format and the first, second, and third values,
        (ii) generate on-the-fly a second video data information that corresponds to at least one pixel of one of a first top margin and a first bottom margin, and
        (iii) store the first and second video data information using the first buffer;
    a second logic circuitry coupled to the first buffer and a second buffer, and is configured to (i) process in the vertical direction the first and second video data information, and (ii) output the vertically processed video data information to the second buffer;
    a third logic circuitry coupled to the second buffer and a fourth logic circuitry, and is configured to:
        (i) retrieve from the second buffer the vertically processed video data information,
        (ii) generate on-the-fly a third video data information that corresponds to at least one pixel of one of a first right margin and a first left margin,
        (iii) process in the horizontal direction the retrieved vertically processed video data information and the third video data information, and
        (iv) stream the vertically and horizontally processed video data information to the fourth logic circuitry; and
    the fourth logic circuitry coupled to a fifth logic circuitry, the first and second programmable registers, and is configured to:
        (i) receive the vertically and horizontally processed video data information,
        (ii) generate a first data enable signal that is synchronized to the received vertically and horizontally processed video data information, and
        (iii) output the vertically and horizontally processed video data information and the first data enable signal to the fifth logic circuitry.

2. The digital image processing apparatus of claim 1, wherein an assertion of the first data enable signal is used to display at least one pixel, whereas a de-assertion of the first data enable signal is used to blank at least one pixel, of the vertically and horizontally processed video data information.

3. The digital image processing apparatus of claim 1, wherein the first memory location comprises video data information that corresponds to a first starting pixel of the first quadrangle digital image.

4. The digital image processing apparatus of claim 1, further comprising:
    a fourth programmable register to store a fourth value that corresponds to a first base index, wherein the first location information comprises the first base index and information that corresponds to the first memory location of the memory device.

5. The digital image processing apparatus of claim 1, wherein the fourth logic circuitry outputs, in accordance with one of the first video format and a second video format, the vertically and horizontally processed video data information to the fifth logic circuitry.

6. The digital image processing apparatus of claim 1, wherein the fifth logic circuitry is coupled to a first display region and is configured to:
    (i) receive the vertically and horizontally processed video data information and the first data enable signal, and
    (ii) display, using the first display region, at least a portion of the vertically and horizontally processed video data information in accordance with the first data enable signal.

7. The digital image processing apparatus of claim 1, wherein the first width comprises a second number of pixels that corresponds to the sum of the first number of pixels and at least one of a third number of pixels that corresponds to a first left wing, and a fourth number of pixels that corresponds to a first right wing.

8. The digital image processing apparatus of claim 7, wherein the first height comprises a second number of lines that corresponds to the sum of the first number of lines and at least one of a third number of lines that corresponds to a first top wing, and a fourth number of lines that corresponds to a first bottom wing.

9. The digital image processing apparatus of claim 8, wherein any one of the first top wing, first bottom wing, first left wing and first right wing comprises video data information of at least one pixel that is directly adjacent to any one of the first top wing, the first bottom wing, the first right wing, and the first left wing.

10. The digital image processing apparatus of claim 1, further comprising:
   a first counter circuitry coupled to the fourth logic circuitry and is configured to count the number of processed lines starting at the first line of the vertically and horizontally processed video data information; and
   the fourth logic circuitry generates the first data enable signal using information that comprises the count information of the first counter circuitry and at least one of the first and second values.

11. The digital image processing apparatus of claim 1, further comprising:
   a second counter circuitry coupled to the fourth logic circuitry and is configured to count the number of processed pixels for each line of the vertically and horizontally processed video data information; and
   the fourth logic circuitry generates the first data enable signal using information that comprises the count information of the second counter circuitry and at least one of the first and second values.

12. The digital image processing apparatus of claim 1, wherein the first logic circuitry generates the second video data information by replicating the video data information of at least one pixel of one of the first top margin and first bottom margin.

13. The digital image processing apparatus of claim 1, wherein the third logic circuitry generates the third video data information by replicating the video data information of at least one pixel of one of the first left margin and first right margin.

14. The digital image processing apparatus of claim 1, further comprising:
   a memory controller coupled to the first logic circuit and the memory device and is configured to:
   (i) receive, from the first logic circuitry, a first memory read command to retrieve the first video data information,
   (ii) output, to the memory device, a first memory device read command in response to the first memory read command,
   (iii) receive, from the memory device, at least a first portion of the first video data information in response to the first memory device read command, and
   (iv) output, to the first logic circuitry, at least a portion of the received first portion of the first video data information in response to the first memory read command.

15. A digital image processing apparatus to process video data information of a captured input digital image comprising:
   a first programmable register to store a first value that corresponds to one of a first and second width of a first and second quadrangle digital images, respectively, wherein the first quadrangle digital image comprises a first portion of the captured input digital image and the second quadrangle digital image comprises a second portion of the captured input digital image;
   a second programmable register to store a second value that corresponds to one of a first and second height of the first and second quadrangle digital images, respectively, wherein the first and second width correspond to a first and second number of pixels in the horizontal direction, respectively, and the first and second height correspond to a first and second number of lines in the vertical direction, respectively;
   a third programmable register to store a third value that corresponds to a first location information of the first quadrangle digital image, wherein the first location information comprises information that corresponds to a first memory location of a memory device;
   a fourth programmable register to store a fourth value that corresponds to a second location information of the second quadrangle digital image, wherein the second location information comprises information that corresponds to a second memory location of the memory device;
   a first logic circuitry coupled to the memory device, a first buffer, and to the first, second, and third programmable registers, and is configured to:
   (i) retrieve from the memory device a first video data information that corresponds to at least a portion of the first quadrangle digital image, in accordance with a first video format and the first, second, and third values,
   (ii) generate on-the-fly a second video data information that corresponds to at least one pixel of one of a first top margin and a first bottom margin, and
   (iii) store the first and second video data information using the first buffer;
   a second logic circuitry coupled to the first buffer and a second buffer, and is configured to (i) process in the vertical direction the first and second video data information, and (ii) output a first vertically processed video data information to the second buffer;
   a third logic circuitry coupled to the second buffer and a fourth logic circuitry, and is configured to:
   (i) retrieve from the second buffer the first vertically processed video data information,
   (ii) generate on-the-fly a third video data information that corresponds to at least one pixel of one of a first right margin and a first left margin,
   (iii) process in the horizontal direction the retrieved first vertically processed video data information and the third video data information, and
   (iv) stream a first vertically and horizontally processed video data information to the fourth logic circuitry; and
   the fourth logic circuitry is coupled to a fifth logic circuitry, the first and second programmable registers, and is configured to:
   (i) receive the first vertically and horizontally processed video data information,
   (ii) generate a first data enable signal that is synchronized to the received first vertically and horizontally processed video data information, and
   (iii) output, in accordance with one of the first video format and a second video format, the first vertically and horizontally processed video data information and the first data enable signal to the fifth logic circuitry.

16. The digital image processing apparatus of claim 15, further comprising:
   a sixth logic circuitry coupled to the memory device and to the first, second, and fourth programmable registers, and is configured to:
   (i) retrieve from the memory device a fourth video data information that corresponds to at least a portion of the second quadrangle digital image, in accordance with the first video format and the first, second, and fourth values,
(ii) generate on-the-fly a fifth video data information that corresponds to at least one pixel of one of a second top margin and a second bottom margin, and
(iii) store the fourth and fifth video data information using a third buffer;
a seventh logic circuitry coupled to the third buffer and a fourth buffer, and is configured to (i) process in the vertical direction the fourth and fifth video data information, and (ii) output a second vertically processed video data information to the fourth buffer;
an eighth logic circuitry coupled to the fourth buffer and a ninth logic circuitry, and is configured to:
(i) retrieve from the fourth buffer the second vertically processed video data information,
(ii) generate on-the-fly a sixth video data information that corresponds to at least one pixel of one of a second right margin and a second left margin,
(iii) process in the horizontal direction the retrieved second vertically processed video data information and the sixth video data information, and
(iv) stream a second vertically and horizontally processed video data information to the ninth logic circuitry; and
the ninth logic circuitry is coupled to a tenth logic circuitry, the first and second programmable registers, and is configured to:
(i) receive the second vertically and horizontally processed video data information,
(ii) generate a second data enable signal that is synchronized to the received second vertically and horizontally processed video data information, and
(iii) output, in accordance with one of the first video format and the second video format, the second vertically and horizontally processed video data information and the second data enable signal to the tenth logic circuitry.

17. The digital image processing apparatus of claim 16, wherein an assertion of the second data enable signal is used to display at least one pixel, whereas a de-assertion of the second data enable signal is used to blank at least one pixel, of the second vertically and horizontally processed video data information.

18. The digital image processing apparatus of claim 16, wherein the first memory location comprises video data information that corresponds to a first starting pixel of the first quadrangle digital image, and the second memory location comprises video data information that corresponds to a second starting pixel of the second quadrangle digital image.

19. The digital image processing apparatus of claim 16, further comprising:
a lookup table coupled to the first and sixth logic circuitry, and is configured to store at least a first and second base index, wherein the first location information comprises the first base index and information that corresponds to the first memory location of the memory device.

20. The digital image processing apparatus of claim 19, wherein the second location information comprises the second base index and information that corresponds to the second memory location of the memory device.

21. The digital image processing apparatus of claim 16, further comprising:
a first display region coupled to the fifth logic circuitry and is configured to:
(i) receive the first vertically and horizontally processed video data information and the first data enable signal from the fifth logic circuitry, and
(ii) display at least a portion of the first vertically and horizontally processed video data information using the first display region and in accordance with the first data enable signal; and
a second display region coupled to the tenth logic circuitry and is configured to:
(i) receive the second vertically and horizontally processed video data information and the second data enable signal from the tenth logic circuitry, and
(ii) display at least a portion of the second vertically and horizontally processed video data information using the second display region and in accordance with the second data enable signal.

22. The digital image processing apparatus of claim 16, wherein:
(i) the first width comprises a third number of pixels that corresponds to the sum of the first number of pixels and at least one of a fourth number of pixels that corresponds to a first left wing, and a fifth number of pixels that corresponds to a first right wing, and
(ii) the second width comprises a sixth number of pixels that corresponds to the sum of the second number of pixels and at least one of a seventh number of pixels that corresponds to a second left wing, and an eighth number of pixels that corresponds to a second right wing.

23. The digital image processing apparatus of claim 22, wherein each of the first width and the second width comprises the same number of pixels.

24. The digital image processing apparatus of claim 22, wherein:
(i) the first height comprises a third number of lines that corresponds to the sum of the first number of lines and at least one of a fourth number of lines that corresponds to a first top wing, and a fifth number of lines that corresponds to a first bottom wing, and
(ii) the second height comprises a sixth number of lines that corresponds to the sum of the second number of lines and at least one of a seventh number of lines that corresponds to a second top wing, and an eighth number of lines that corresponds to a second bottom wing.

25. The digital image processing apparatus of claim 24, wherein each of the first height and the second height comprises the same number of lines.

26. The digital image processing apparatus of claim 24, wherein:
(i) any one of the first top wing, first bottom wing, first left wing and first right wing comprises video data information of at least one pixel that is directly adjacent to any one of the first top wing, the first bottom wing, the first right wing, and the first left wing, and
(ii) any one of the second top wing, second bottom wing, second left wing and second right wing comprises video data information of at least one pixel that is directly adjacent to any one of the second top wing, the second bottom wing, the second right wing, and the second left wing.

27. The digital image processing apparatus of claim 16, further comprising:
a first counter circuitry coupled to the fourth logic circuitry and is configured to count the number of processed lines starting at the first line of the first vertically and horizontally processed video data information; and
a second counter circuitry coupled to the fourth logic circuitry and is configured to count the number of processed pixels for each line of the first vertically and horizontally processed video data information, wherein the fourth logic circuitry generates the first data enable signal using information that comprises at least one of the first value, second value, count information of the first counter circuitry, and count information of the second counter circuitry.

28. The digital image processing apparatus of claim 27, further comprising:
a third counter circuitry coupled to the ninth logic circuitry and is configured to count the number of processed lines starting at the first line of the second vertically and horizontally processed video data information; and
a fourth counter circuitry coupled to the ninth logic circuitry and is configured to count the number of processed pixels for each line of the second vertically and horizontally processed video data information, wherein the ninth logic circuitry generates the second data enable signal using information that comprises at least one of the first value, second value, count information of the third counter circuitry, and count information of the fourth counter circuitry.

29. The digital image processing apparatus of claim 16, further comprising:
a memory controller coupled to the first and sixth logic circuitry and the memory device, and is configured to:
(i) receive, from the first logic circuitry, a first memory read command to retrieve the first video data information,
(ii) receive, from the sixth logic circuitry, a second memory read command to retrieve the fourth video data information,
(iii) output, to the memory device, a first memory device read command in response to the first memory read command,
(iv) output, to the memory device, a second memory device read command in response to the second memory read command,
(v) receive, from the memory device, at least a first portion of the first video data information in response to the first memory device read command,
(vi) output, to the first logic circuitry, at least a portion of the received first portion of the first video data information in response to the first memory read command,
(vii) receive, from the memory device, at least a first portion of the fourth video data information in response to the second memory device read command, and
(viii) output, to the sixth logic circuitry, at least a portion of the received first portion of the fourth video data information in response to the second memory read command.

30. The digital image processing apparatus of claim 15, wherein the second portion of the captured input digital image that corresponds to the second quadrangle digital image has at least one pixel in common with the first portion of the captured input digital image that corresponds to the first quadrangle digital image.

31. The digital image processing apparatus of claim 15, wherein an assertion of the first data enable signal is used to display at least one pixel, whereas a de-assertion of the first data enable signal is used to blank at least one pixel, of the first vertically and horizontally processed video data information.

* * * * *